United States Patent
Kung et al.

(10) Patent No.: US 11,095,352 B2
(45) Date of Patent: Aug. 17, 2021

(54) METHOD AND APPARATUS FOR HANDLING IDC PROBLEMS IN NR IN A WIRELESS COMMUNICATION SYSTEM

(71) Applicant: ASUSTek Computer Inc., Taipei (TW)

(72) Inventors: Yi-Hsuan Kung, Taipei (TW); Yu-Hsuan Guo, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 16/821,435

(22) Filed: Mar. 17, 2020

(65) Prior Publication Data
US 2020/0322023 A1 Oct. 8, 2020

Related U.S. Application Data

(60) Provisional application No. 62/828,767, filed on Apr. 3, 2019, provisional application No. 62/828,786, filed on Apr. 3, 2019.

(51) Int. Cl.
*H04B 7/06* (2006.01)
*H04B 7/08* (2006.01)

(52) U.S. Cl.
CPC ......... *H04B 7/0626* (2013.01); *H04B 7/0695* (2013.01); *H04B 7/088* (2013.01)

(58) Field of Classification Search
CPC .... H04B 7/0626; H04B 7/0695; H04B 7/088; H04W 72/1215; H04W 36/0094; H04W 48/16; H04W 48/20
See application file for complete search history.

(56) References Cited

U.S. PATENT DOCUMENTS

| | | | |
|---|---|---|---|
| 9,806,836 B2* | 10/2017 | Sadek | H04J 3/14 |
| 2013/0281096 A1 | 10/2013 | Baghel et al. | |
| 2015/0139015 A1 | 5/2015 | Kadous et al. | |
| 2018/0324618 A1* | 11/2018 | Chay | H04W 72/1215 |
| 2019/0150133 A1* | 5/2019 | Li | H04B 7/088 375/224 |
| 2019/0253966 A1* | 8/2019 | Park | H04W 28/0221 |
| 2020/0260463 A1* | 8/2020 | Lovlekar | H04W 72/1215 |
| 2020/0322023 A1* | 10/2020 | Kung | H04B 7/088 |
| 2021/0067299 A1* | 3/2021 | Wu | H04B 15/00 |
| 2021/0127405 A1* | 4/2021 | Ma | H04W 72/1215 |

OTHER PUBLICATIONS

Huawei,"Beam measurement and reporting using L1-SINR",TSG RAN WG1 Meeting #95 R1-1813560 Spokane, USA, Nov. 12-16, 2018.
Ericsson,"Performance of beam selection based on L1-SINR", 3GPP TSG RAN WG1 Ad-Hoc Meeting 1901 Tdoc R1-1901204 Taipei, Taiwan, Jan. 21-25, 2019.

(Continued)

*Primary Examiner* — Dac V Ha
(74) *Attorney, Agent, or Firm* — Cooper Legal Group, LLC

(57) ABSTRACT

A method and apparatus are disclosed. In an example from the perspective of a User Equipment (UE), the UE determines whether a beam associated with a reference signal of a cell has an In-Device Coexistence (IDC) problem. The UE determines whether to include information associated with the reference signal in a report based on whether the beam associated with the reference signal has the IDC problem. The UE transmits the report to a network node.

21 Claims, 16 Drawing Sheets

(56) References Cited

OTHER PUBLICATIONS

Ericsson, "Performance of beam selection based on L1-SINR", 3GPP TSG-RAN WG1 Meeting #96bis Tdoc R1-1905160 Xi'an, China, Apr. 8-12, 2019.
Corresponding European Patent Application No. EP20163494.6, Extended European Search Report dated Aug. 13, 2020.
Ericsson, "Measurement Report Content", 3GPP TSG-RAN WG2 #98 Discussion, Decision Tdoc R2-1704106 Hangzhou, P.R. of China, May 15-19, 2017.
Nokia, Alcatel-Lucent Shanghai Bell, "RRM and Bean Reporting", 3GPP TSG-RAN WG2 Meeting #98 R2-1704289 Hangzhou, China, May 15-19, 2017.
3GPP A Global Initiative, "3rd Generation Partnership Project; Technical Specification Group Radio Access Network; NR; Radio Resource Control (RRC) Protocol Specification (Release 15)", 3GPP TS 38.331, V15.5.0, 3rd Generation Partnership Project, RAN WG2, Sophia-Antipolis Cedex, France, Apr. 2, 2019. Part 1 and Part 2.

* cited by examiner

METHOD AND APPARATUS FOR HANDLING IDC PROBLEMS IN NR IN A WIRELESS COMMUNICATION SYSTEM

CROSS-REFERENCE TO RELATED APPLICATIONS

The present application claims the benefit of U.S. Provisional Patent Application Ser. No. 62/828,767 filed on Apr. 3, 2019, the entire disclosure of which is incorporated herein in its entirety by reference. The present application also claims the benefit of U.S. Provisional Patent Application Ser. No. 62/828,786 filed on Apr. 3, 2019, the entire disclosure of which is incorporated herein in its entirety by reference.

FIELD

This disclosure generally relates to wireless communication networks, and more particularly, to a method and apparatus for handling In-Device Coexistence (IDC) problems in New Radio (NR) Access Technology in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

In accordance with the present disclosure, one or more devices and/or methods are provided. In an example from the perspective of a User Equipment (UE), the UE determines whether a beam associated with a reference signal of a cell has an In-Device Coexistence (IDC) problem. The UE determines whether to include information associated with the reference signal in a report based on whether the beam associated with the reference signal has the IDC problem. The UE transmits the report to a network node.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), $3^{rd}$ Generation Partnership Project (3GPP) LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio) wireless access for 5G, or some other modulation techniques.

In particular, the exemplary wireless communication systems devices described below may be designed to support one or more standards such as the standard offered by a consortium named "3rd Generation Partnership Project" referred to herein as 3GPP, including: 3GPP TS 36.300 V15.4.0, Overall description; 3GPP TS 36.331 V15.2.2, Radio Resource Control (RRC) protocol specification; 3GPP TS 38.321 V15.2.0, Medium Access Control (MAC) protocol specification; 3GPP TR 38.912 V15.0.0, Study on New Radio (NR) access technology; TS 38.331 V15.4.0, Radio Resource Control (RRC) protocol specification; TS 38.214 V15.5.0, Physical layer procedures for data. The standards and documents listed above are hereby expressly incorporated by reference in their entirety.

Figure 1:
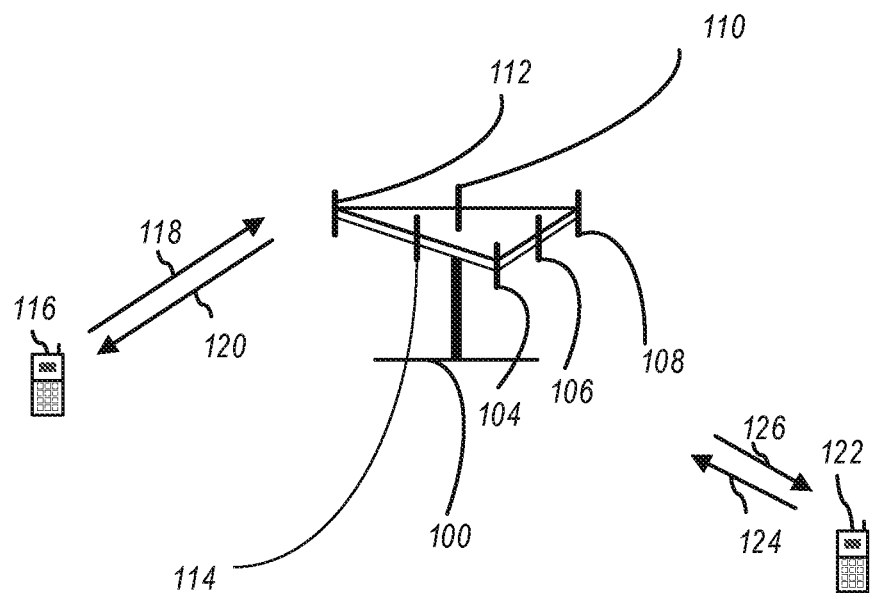
FIG. 1 shows a diagram of a wireless communication system according to one exemplary embodiment.

FIG. 1 presents a multiple access wireless communication system in accordance with one or more embodiments of the disclosure. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. AT 122 is in communication with antennas 106 and 108, where antennas 106 and 108 transmit information to AT 122 over forward link 126 and receive information from AT 122 over reverse link 124. In a frequency-division duplexing (FDD) system, communication links 118, 120, 124 and 126 may use different frequencies for communication. For example, forward link 120 may use a different frequency than that used by reverse link 118.

Each group of antennas and/or the area in which they are designed to communicate is often referred to as a sector of the access network. In the embodiment, antenna groups each may be designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage may normally cause less interference to access terminals in neighboring cells than an access network transmitting through a single antenna to its access terminals.

An access network (AN) may be a fixed station or base station used for communicating with the terminals and may also be referred to as an access point, a Node B, a base station, an enhanced base station, an eNodeB (eNB), a Next Generation NodeB (gNB), or some other terminology. An access terminal (AT) may also be called user equipment (UE), a wireless communication device, terminal, access terminal or some other terminology.

Figure 2:
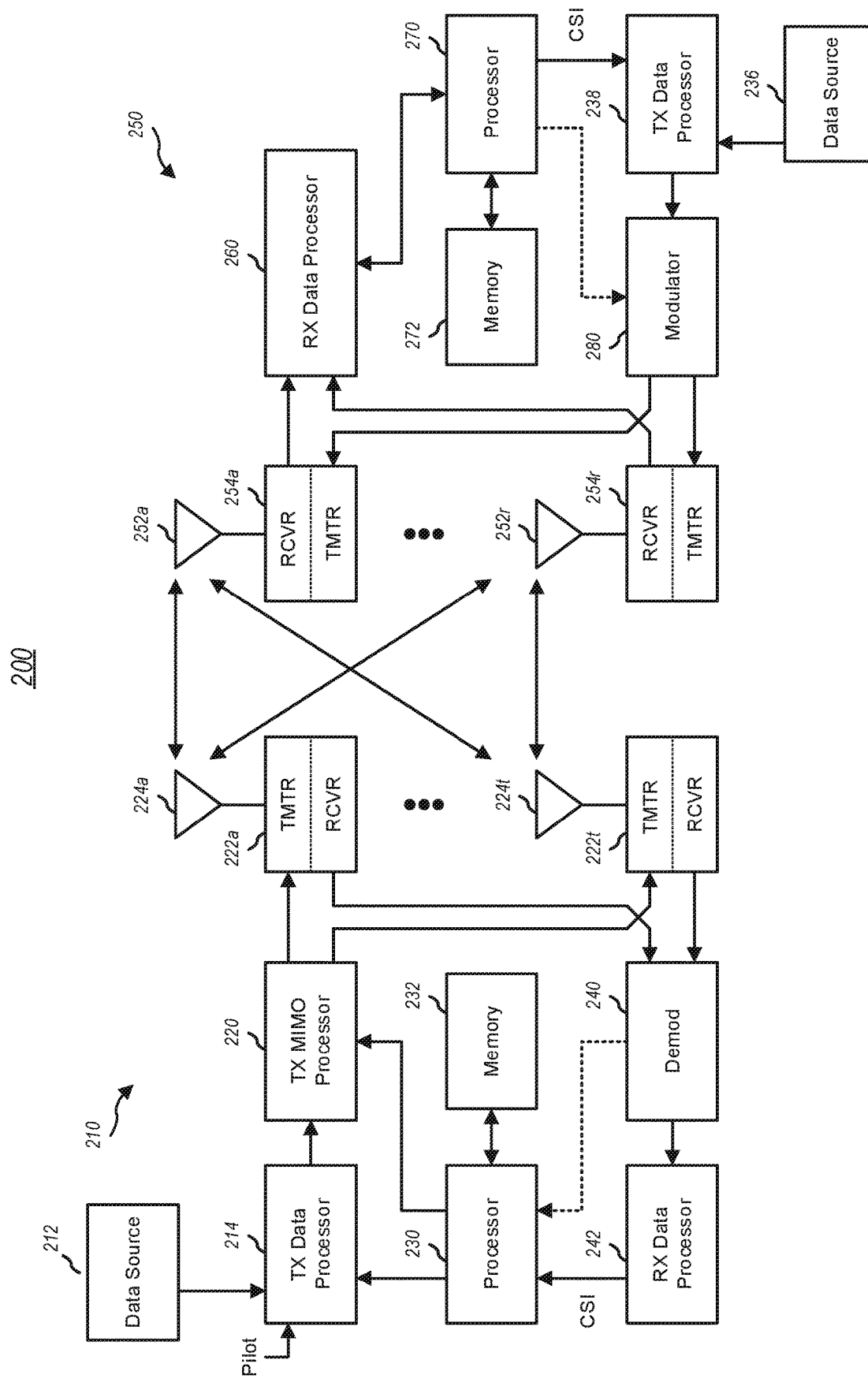
FIG. 2 is a block diagram of a transmitter system (also known as access network) and a receiver system (also known as user equipment or UE) according to one exemplary embodiment.

FIG. 2 presents an embodiment of a transmitter system 210 (also known as the access network) and a receiver system 250 (also known as access terminal (AT) or user equipment (UE)) in a multiple-input and multiple-output (MIMO) system 200. At the transmitter system 210, traffic data for a number of data streams may be provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using orthogonal frequency-division multiplexing (OFDM) techniques. The pilot data may typically be a known data pattern that is processed in a known manner and may be used at the receiver system to estimate the channel response. The multiplexed pilot and coded data for each data stream may then be modulated (i.e., symbol mapped) based on a particular modulation scheme (e.g., binary phase shift keying (BPSK), quadrature phase shift keying (QPSK), M-ary phase shift keying (M-PSK), or M-ary quadrature amplitude modulation (M-QAM)) selected for that data stream to provide modulation symbols. The data rate, coding, and/or modulation for each data stream may be determined by instructions performed by processor 230.

The modulation symbols for data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 may apply beamforming weights to the symbols of the data streams and to the antenna from which the symbol is being transmitted.

Each transmitter 222 receives and processes a respective symbol stream to provide one or more analog signals, and further conditions (e.g., amplifies, filters, and/or upconverts) the analog signals to provide a modulated signal suitable for transmission over the MIMO channel. $N_T$ modulated signals from transmitters 222a through 222t may then be transmitted from $N_T$ antennas 224a through 224t, respectively.

At receiver system 250, the transmitted modulated signals are received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and/or further process the samples to provide a corresponding "received" symbol stream.

An RX data processor 260 then receives and/or processes the $N_R$ received symbol streams from $N_R$ receivers 254 based on a particular receiver processing technique to provide $N_T$ "detected" symbol streams. The RX data processor 260 may then demodulate, deinterleave, and/or decode each detected symbol stream to recover the traffic data for the data stream. The processing by RX data processor 260 may be complementary to that performed by TX MIMO processor 220 and TX data processor 214 at transmitter system 210.

A processor 270 may periodically determine which precoding matrix to use (discussed below). Processor 270 formulates a reverse link message comprising a matrix index portion and a rank value portion.

The reverse link message may comprise various types of information regarding the communication link and/or the received data stream. The reverse link message may then be processed by a TX data processor 238, which may also receive traffic data for a number of data streams from a data source 236, modulated by a modulator 280, conditioned by transmitters 254a through 254r, and/or transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 may then determine which pre-coding matrix to use for determining the beamforming weights and may then process the extracted message.

Figure 3:
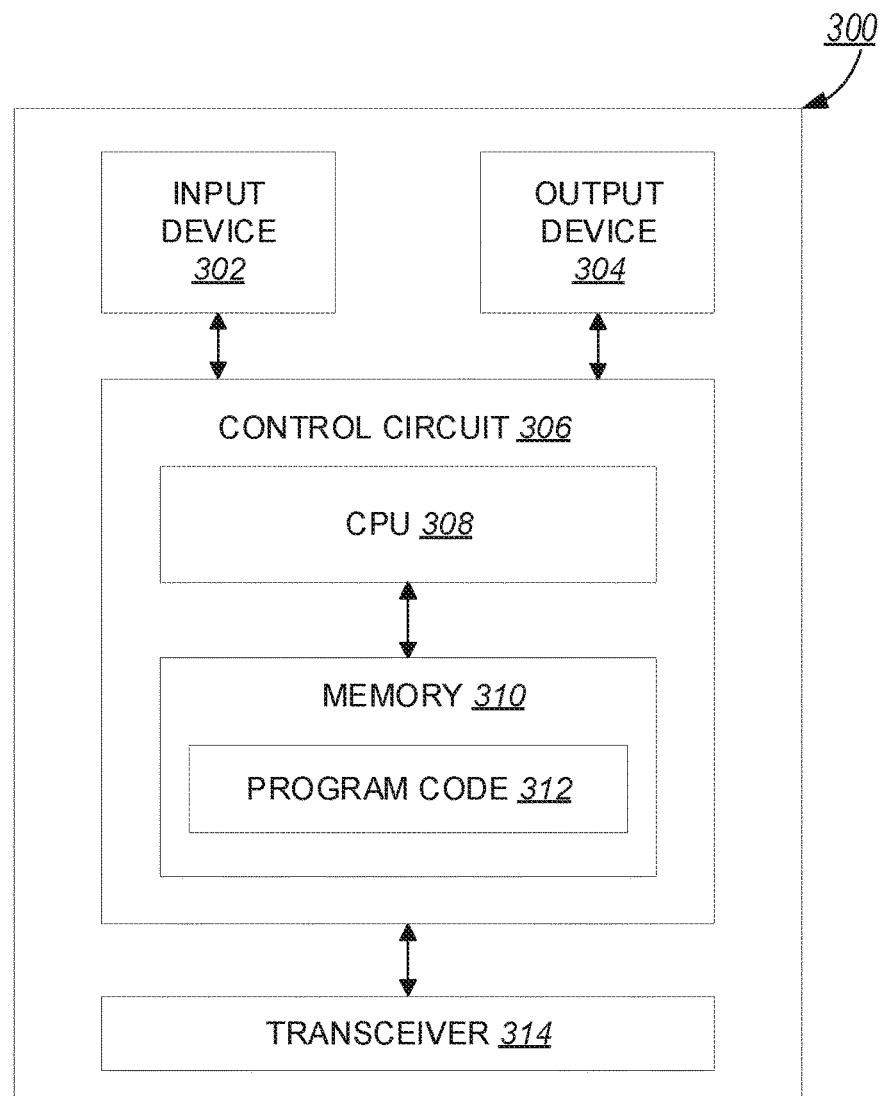
FIG. 3 is a functional block diagram of a communication system according to one exemplary embodiment.

FIG. 3 presents an alternative simplified functional block diagram of a communication device according to one embodiment of the disclosed subject matter. As shown in FIG. 3, the communication device 300 in a wireless communication system can be utilized for realizing the UEs (or ATs) 116 and 122 in FIG. 1 or the base station (or AN) 100 in FIG. 1, and the wireless communications system may be the LTE system or the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
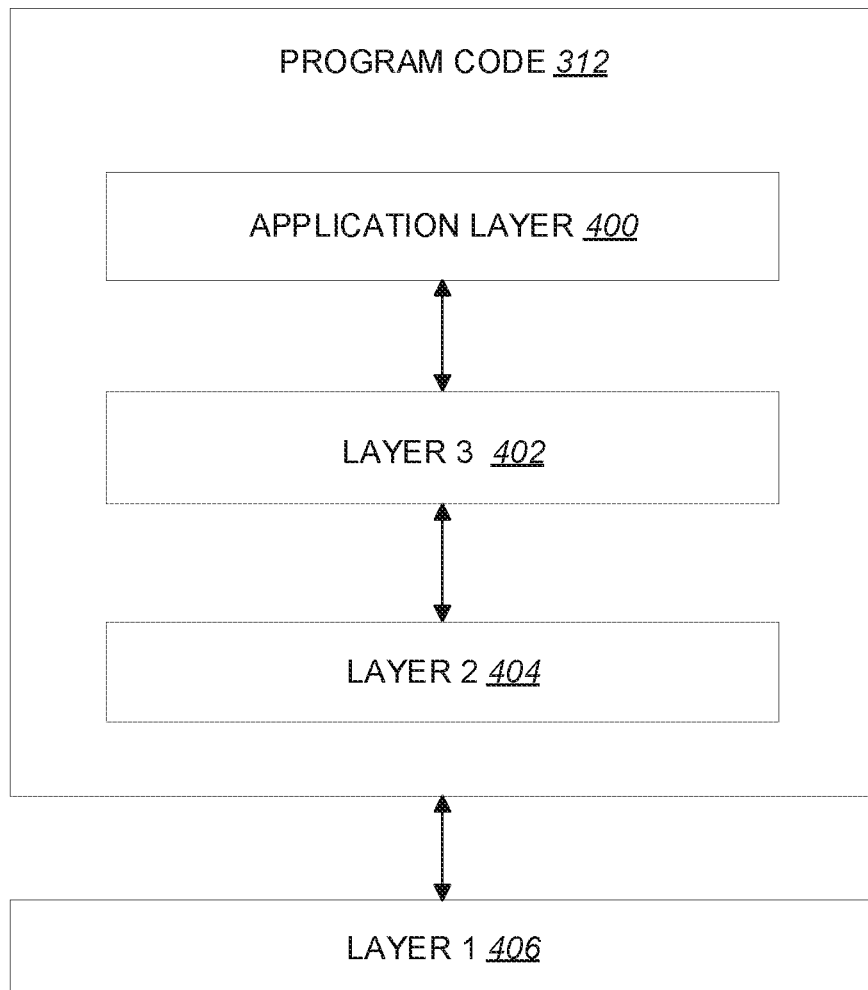
FIG. 4 is a functional block diagram of the program code of FIG. 3 according to one exemplary embodiment.

FIG. 4 is a simplified block diagram of the program code 312 shown in FIG. 3 in accordance with one embodiment of the disclosed subject matter. In this embodiment, the program code 312 includes an application layer 400, a Layer 3 portion 402, and a Layer 2 portion 404, and is coupled to a Layer 1 portion 406. The Layer 3 portion 402 may perform radio resource control. The Layer 2 portion 404 may perform link control. The Layer 1 portion 406 may perform and/or implement physical connections.

3GPP TR 38.912 V15.0.0 discusses the concept of beam management and reference signals in NR.

8.2.1.6.1 Beam Management

In NR, beam management is defined as follows:

Beam management: a set of L1/L2 procedures to acquire and maintain a set of TRxP(s) and/or UE beams that can be used for DL and UL transmission/reception, which include at least following aspects:

Beam determination: for TRxP(s) or UE to select of its own Tx/Rx beam(s).

Beam measurement: for TRxP(s) or UE to measure characteristics of received beamformed signals Beam reporting: for UE to report information of beamformed signal(s) based on beam measurement Beam sweeping: operation of covering a spatial area, with beams transmitted and/or received during a time interval in a predetermined way.

[ . . . ]

The following DL L1/L2 beam management procedures are supported within one or multiple TRxPs:

P-1: is used to enable UE measurement on different TRxP Tx beams to support selection of TRxP Tx beams/UE Rx beam(s)

For beamforming at TRxP, it typically includes a intra/inter-TRxP Tx beam sweep from a set of different beams. For beamforming at UE, it typically includes a UE Rx beam sweep from a set of different beams.

P-2: is used to enable UE measurement on different TRxP Tx beams to possibly change inter/intra-TRxP Tx beam(s)

From a possibly smaller set of beams for beam refinement than in P-1. Note that P-2 can be a special case of P-1.

P-3: is used to enable UE measurement on the same TRxP Tx beam to change UE Rx beam in the case UE uses beamforming At least network triggered aperiodic beam reporting is supported under P-1, P-2, and P-3 related operations.

UE measurement based on RS for beam management (at least CSI-RS) is composed of K (=total number of configured beams) beams, and UE reports measurement results of N selected Tx beams, where N is not necessarily fixed number. Note that the procedure based on RS for mobility purpose is not precluded. Reporting information at least include measurement quantities for N beam (s) and information indicating N DL Tx beam(s), if N<K. Specifically, when a UE is configured with K'>1 non-zero power (NZP) CSI-RS resources, a UE can report N' CRIs (CSI-RS Resource Indicator).

A UE can be configured with the following high layer parameters for beam management:

N≥1 reporting settings, M≥1 resource settings

The links between reporting settings and resource settings are configured in the agreed CSI measurement setting CSI-RS based P-1 & P-2 are supported with resource and reporting settings P-3 can be supported with or without reporting setting A reporting setting at least including Information indicating selected beam(s)

L1 measurement reporting

Time-domain behavior: e.g. aperiodic, periodic, semi-persistent

Frequency-granularity if multiple frequency granularities are supported

A resource setting at least including

Time-domain behavior: e.g. aperiodic, periodic, semi-persistent

RS type: NZP CSI-RS at least

At least one CSI-RS resource set, with each CSI-RS resource set having K≥1 CSI-RS resources Some parameters of K CSI-RS resources can be the same, e.g. port number, time-domain behavior, density and periodicity if any At least one of these two alternatives of beam reporting is supported.

Alt 1:

UE reports information about TRxP Tx Beam(s) that can be received using selected UE Rx beam set(s) where a Rx beam set refers to a set of UE Rx beams that are used for receiving a DL signal. Note that it is UE implementation issues on how to construct the Rx beam set. One example is that each of Rx beam in a UE Rx beam set corresponds to a selected Rx beam in each panel. For UEs with more than one UE Rx beam sets, the UE can report TRxP Tx Beam(s) and an identifier of the associated UE Rx beam set per reported TX beam(s).

NOTE: Different TRxP Tx beams reported for the same Rx beam set can be received simultaneously at the UE.

NOTE: Different TRxP TX beams reported for different UE Rx beam set may not be possible to be received simultaneously at the UE Alt 2:

UE reports information about TRxP Tx Beam(s) per UE antenna group basis where UE antenna group refers to receive UE antenna panel or subarray. For UEs with more than one UE antenna group, the UE can report TRxP Tx Beam(s) and an identifier of the associated UE antenna group per reported TX beam.

NOTE: Different TX beams reported for different antenna groups can be received simultaneously at the UE.

NOTE: Different TX beams reported for the same UE antenna group may not be possible to be received simultaneously at the UE NR also supports the following beam reporting considering L groups where L>=1 and each group refers to a Rx beam set (Alt1) or a UE antenna group (Alt2) depending on which alternative is adopted. For each group l, UE reports at least the following information:

Information indicating group at least for some cases

Measurement quantities for $N_l$ beam (s)

Support L1 RSRP and CSI report (when CSI-RS is for CSI acquisition)

Information indicating $N_l$ DL Tx beam(s) when applicable

This group based beam reporting is configurable per UE basis. This group based beam reporting can be turned off per UE basis e.g., when L=1 or $N_l$=1. Note that no group identifier is reported when it is turned off.

[ . . . ]

NR supports beam management with and without beam-related indication. When beam-related indication is provided, information pertaining to UE-side beamforming/receiving procedure used for CSI-RS-based measurement can be indicated through QCL to UE. NR supports using the same or different beams on control channel and the corresponding data channel transmissions.

[ . . . ]

TS 38.214 V15.5.0 introduces Channel State information and L1-RSRP reporting.

5.2 UE Procedure for Reporting Channel State Information (CSI)

5.2.1 Channel State Information Framework

The time and frequency resources that can be used by the UE to report CSI are controlled by the gNB. CSI may consist of Channel Quality Indicator (CQI), preceding matrix indicator (PMI), CSI-RS resource indicator (CRI), SS/PBCH Block Resource indicator (SSBRI), layer indicator (LI), rank indicator (RI) and/or L1-RSRP.

For CQI, PMI, CRI, SSBRI, LI, RI, L1-RSRP, a UE is configured by higher layers with N≥1 CSI-ReportConfig Reporting Settings, M≥1 CSI-ResourceConfig Resource Settings, and one or two list(s) of trigger states (given by the higher layer parameters CSI-AperiodicTriggerStateList and CSI-SemiPersistentOnPUSCH-TriggerStateList). Each trigger state in CSI-AperiodicTriggerStateList contains a list of associated CSI-ReportConfigs indicating the Resource Set IDs for channel and optionally for interference. Each trigger state in CSI-SemiPersistentOnPUSCH-TriggerStateList contains one associated CSI-ReportConfig.

5.2.1.4 Reporting Configurations

[ . . . ]

The Reporting configuration for CSI can be aperiodic (using PUSCH), periodic (using PUCCH) or semi-persistent (using PUCCH, and DCI activated PUSCH). The CSI-RS Resources can be periodic, semi-persistent, or aperiodic.

5.2.1.4.2 Report Quantity Configurations

A UE may be configured with a CSI-ReportConfig with the higher layer parameter reportQuantity set to either 'none', 'cri-RI-PMI-CQI', 'cri-RI-i1', 'cri-RI-i1-CQI', 'cri-RI-CQI', 'cri-RSRP', 'ssb-Index-RSRP' or 'cri-RI-LI-PMI-CQI'.

5.2.1.4.3 L1-RSRP Reporting

For L1-RSRP Computation the UE may be configured with CSI-RS resources, SS/PBCH Block resources or both CSI-RS and SS/PBCH block resources, when resource-wise quasi co-located with 'QCL-Type C' and 'QCL-TypeD' when applicable.

the UE may be configured with CSI-RS resource setting up to 16 CSI-RS resource sets having up to 64 resources within each set. The total number of different CSI-RS resources over all resource sets is no more than 128.

For L1-RSRP reporting, if the higher layer parameter nrofReportedRS in CSI-ReportConfig is configured to be one, the reported L1-RSRP value is defined by a 7-bit value in the range [−140, −44] dBm with 1 dB step size, if the higher layer parameter nrofReportedRS is configured to be larger than one, or if the higher layer parameter groupBasedBeamReporting is configured as 'enabled', the UE shall use differential L1-RSRP based reporting, where the largest measured value of L1-RSRP is quantized to a 7-bit value in the range [−140, −44] dBm with 1 dB step size, and the differential L1-RSRP is quantized to a 4-bit value. The differential L1-RSRP value is computed with 2 dB step size with a reference to the largest measured L1-RSRP value which is part of the same L1-RSRP reporting instance. The mapping between the reported L1-RSRP value and the measured quantity is described in [11, TS 38.133].

TS 38.331 V15.4.0 introduces configurations for CSI reporting in NR.

CSI-ReportConfig

The IE CSI-ReportConfig is used to configure a periodic or semi-persistent report sent on PUCCH on the cell in which the CSI-ReportConfig is included, or to configure a semi-persistent or aperiodic report sent on PUSCH triggered by DCI received on the cell in which the CSI-ReportConfig is included (in this case, the cell on which the report is sent is determined by the received DCI). See TS 38.214 [19], clause 5.2.1.

CSI-ReportConfig Information Element

```
-- ASN1START
-- TAG-CSI-REPORTCONFIG-START
CSI-ReportConfig ::=                         SEQUENCE {
    reportConfigId                               CSI-ReportConfigId,
    carrier                                      ServCellIndex             OPTIONAL,     -- Need S
    resourcesForChannelMeasurement               CSI-ResourceConfigId,
    csi-IM-ResourcesForInterference              CSI-ResourceConfigId   OPTIONAL,     -- Need R
    nzp-CSI-RS-ResourcesForInterference          CSI-ResourceConfigId   OPTIONAL,     -- Need R
    reportConfigType                             CHOICE {
        periodic                                     SEQUENCE {
            reportSlotConfig                             CSI-ReportPeriodicityAndOffset,
            pucch-CSI-ResourceList                       SEQUENCE (SIZE (1..maxNrofBWPs))
                                                         OF PUCCH-
    CSI-Resource
        },
        semiPersistentOnPUCCH                        SEQUENCE {
            reportSlotConfig                             CSI-ReportPeriodicityAndOffset,
            pucch-CSI-ResourceList                       SEQUENCE (SIZE (1..maxNrofBWPs))
                                                         OF PUCCH-
    CSI-Resource
        },
        semiPersistentOnPUSCH                        SEQUENCE {
            reportSlotConfig                             ENUMERATED {sl5, sl10, sl20, sl40, sl80,
    Sl160, Sl320},
```

```
                reportSlotOffsetList            SEQUENCE (SIZE (1.. maxNrofUL-Allocations)) OF
INTEGER(0..32),
                p0alpha                         P0-PUSCH-AlphaSetId
        },
        aperiodic                               SEQUENCE {
                reportSlotOffsetList            SEQUENCE (SIZE (1..maxNrofUL-Allocations)) OF
INTEGER(0..32)
        }
    },
    reportQuantity                              CHOICE {
        none                                    NULL,
        cri-RI-PMI-CQI                          NULL,
        cri-RI-i1                               NULL,
        cri-RI-i1-CQI                           SEQUENCE {
                pdsch-BundleSizeForCSI          ENUMERATED {n2, n4}
OPTIONAL        -- Need S
        },
        cri-RI-CQI                              NULL,
        cri-RSRP                                NULL,
        ssb-Index-RSRP                          NULL,
        cri-RI-LI-PMI-CQI                       NULL
    },
[...]
```

| CSI-ReportConfig field descriptions |
| --- |
| carrier |
| Indicates in which serving cell the CSI-ResourceConfig indicated below are to be found. If the field is absent, the resources are on the same serving cell as this report configuration. |
| reportConfigType |
| Time domain behavior of reporting configuration |
| reportQuantity |
| The CSI related quantities to report. Corresponds to L1 parameter 'ReportQuantity' (see TS 38.214 [19], clause 5.2.1). |
| resourcesForChannelMeasurement |
| Resources for channel measurement. csi-ResourceConfigId of a CSI-ResourceConfig included in the configuration of the serving cell indicated with the field "carrier" above. The CSI-ResourceConfig indicated here contains only NZP-CSI-RS resources and/or SSB resources. This CSI-ReportConfig is associated with the DL BWP indicated by bwp-Id in that CSI-ResourceConfig. |

CSI-SemiPersistentOnPUSCH-TriggerStateList

The CSI-SemiPersistentOnPUSCH-TriggerStateList IE is used to configure the UE with list of trigger states for semi-persistent reporting of channel state information on L1. See also TS 38.214 [19], clause 5.2.

CSI-SemiPersistentOnPUSCH-TriggerStateList Information Element

```
-- ASN1START
-- TAG-CSI-SEMIPERSISTENTONPUSCHTRIGGERSTATELIST-START
CSI-SemiPersistentOnPUSCH-TriggerStateList ::=    SEQUENCE(SIZE (1..maxNrOfSemiPersistentPUSCH-
Triggers)) OF CSI-SemiPersistentOnPUSCH-TriggerState
CSI-SemiPersistentOnPUSCH-TriggerState ::=        SEQUENCE {
    associatedReportConfigInfo                        CSI-ReportConfigId,
    ...
}
-- TAG-CSI-SEMIPERSISTENTONPUSCHTRIGGERSTATELIST-STOP
-- ASN1STOP
```

CSI-AperiodicTriggerStateList

The CSI-AperiodicTriggerStateList IE is used to configure the UE with a list of aperiodic trigger states. Each codepoint of the DCI field "CSI request" is associated with one trigger state. Upon reception of the value associated with a trigger state, the UE will perform measurement of CSI-RS (reference signals) and aperiodic reporting on L1 according to all entries in the associatedReportConfigInfoList for that trigger state.

CSI-AperiodicTriggerStateList Information Element

```
-- ASN1START
-- TAG-CSI-APERIODICTRIGGERSTATELIST-START
CSI-AperiodicTriggerStateList ::=        SEQUENCE (SIZE (1..maxNrOfCSI-AperiodicTriggers)) OF CSI-
AperiodicTriggerState
```

-continued

```
CSI-AperiodicTriggerState ::=          SEQUENCE {
    associatedReportConfigInfoList     SEQUENCE
(SIZE(1..maxNrofReportConfigPerAperiodicTrigger)) OF CSI-AssociatedReportConfigInfo,
    ...
}
CSI-AssociatedReportConfigInfo ::=     SEQUENCE {
    reportConfigId                     CSI-ReportConfigId,
    resourcesForChannel                CHOICE {
        nzp-CSI-RS                         SEQUENCE {
            resourceSet                        INTEGER (1..maxNrofNZP-CSI-RS-
ResourceSetsPerConfig),
            qcl-info                           SEQUENCE (SIZE(1..maxNrofAP-CSI-RS-
ResourcesPerSet)) OF TCI-StateId OPTIONAL -- Cond Aperiodic
        },
        csi-SSB-ResourceSet                INTEGER (1..maxNrofCSI-SSB-ResourceSetsPerConfig)
    },
    csi-IM-ResourcesForInterference    INTEGER(1..maxNrofCSI-IM-ResourceSetsPerConfig)
OPTIONAL, -- Cond CSI-IM-ForInterference
    nzp-CSI-RS-ResourcesForInterference    INTEGER (1..maxNrofNZP-CSI-RS-ResourceSetsPerConfig)
OPTIONAL, -- Cond NZP-CSI-RS-ForInterference
    ...
}
-- TAG-CSI-APERIODICTRIGGERSTATELIST-STOP
-- ASN1STOP
```

| CSI-AssociatedReportConfigInfo field descriptions |
|---|
| csi-SSB-ResourceSet |
| CSI-SSB-ResourceSet for channel measurements. Entry number in csi-SSB-ResourceSetList in the CSI-ResourceConfig indicated by resourcesForChannelMeasurement in the CSI-ReportConfig indicated by reportConfigId above (1 corresponds to the first entry, 2 to the second entry, and so on). |
| qcl-info |
| List of references to TCI-States for providing the QCL source and QCL type for each NZP-CSI-RS-Resource listed in nzp-CSI-RS-Resources of the NZP-CSI-RS-ResourceSet indicated by nzp-CSI-RS-ResourcesforChannel. Each TCI-StateId refers to the TCI-State which has this value for tci-StateId and is defined in tci-StatesToAddModList in the PDSCH-Config included in the BWP-Downlink corresponding to the serving cell and to the DL BWP to which the resourcesForChannelMeasurement (in the CSI-ReportConfig indicated by reportConfigId above) belong to. First entry in qcl-info-forChannel corresponds to first entry in nzp-CSI-RS-Resources of that NZP-CSI-RS-ResourceSet, second entry in qcl-info-forChannel corresponds to second entry in nzp-CSI-RS-Resources, and so on (see TS 38.214 [19], clause 5.2.1.5.1) |
| reportConfigId |
| The reportConfigId of one of the CSI-ReportConfigToAddMod configured in CSI-MeasConfig |
| resourceSet |
| NZP-CSI-RS-ResourceSet for channel measurements. Entry number in nzp-CSI-RS-ResourceSetList in the CSI-ResourceConfig indicated by resourcesForChannelMeasurement in the CSI-ReportConfig indicated by reportConfigId above (1 corresponds to the first entry, 2 to thesecond entry, and so on). |

Figure 5:
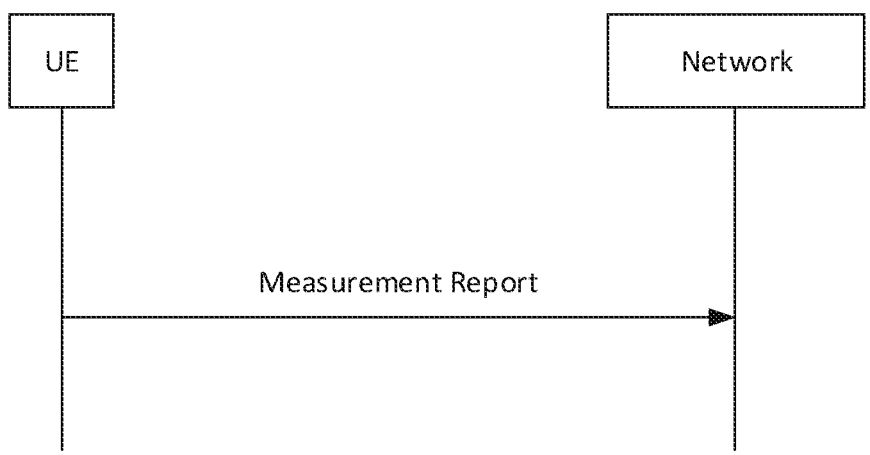
FIG. 5 is a diagram illustrating an exemplary scenario associated with measurement reporting according to one exemplary embodiment.

TS 38.331 V15.4.0 introduces beam measurement and reporting in NR. Notably, Figure 5.5.5.1-1 of Section 5.5.5.1 of TS 38.331 V15.4.0, entitled "Measurement reporting", is reproduced herein as FIG. 5.

5.5.3 Performing Measurements 5.5.3.1 General

An RRC_CONNECTED UE shall derive cell measurement results by measuring one or multiple beams associated per cell as configured by the network, as described in 5.5.3.3. For all cell measurement results in RRC_CONNECTED the UE applies the layer 3 filtering as specified in 5.5.3.2, before using the measured results for evaluation of reporting criteria and measurement reporting. For cell measurements, the network can configure RSRP, RSRQ or SINR as trigger quantity. Reporting quantities can be the same as trigger quantity or combinations of quantities (i.e. RSRP and RSRQ; RSRP and SINR; RSRQ and SINR; RSRP, RSRQ and SINR).

The network may also configure the UE to report measurement information per beam (which can either be measurement results per beam with respective beam identifier(s) or only beam identifier(s)), derived as described in 5.5.3.3a. If beam measurement information is configured to be included in measurement reports, the UE applies the layer 3 beam filtering as specified in 5.5.3.2. On the other hand, the exact layer 1 filtering of beam measurements used to derive cell measurement results is implementation dependent.

The UE shall:
1> whenever the UE has a measConfig, perform RSRP and RSRQ measurements for each serving cell for which servingCellMO is configured as follows:
  2> if at least one measId included in the measIdList within VarMeasConfig contains an rsType set to ssb:
    3> if at least one measId included in the measIdList within VarMeasConfig contains a reportQuantityRS-Indexes and maxNrofRS-IndexesToReport and contains an rsType set to ssb:
      4> derive layer 3 filtered RSRP and RSRQ per beam for the serving cell based on SS/PBCH block, as described in 5.5.3.3a;
    3> derive serving cell measurement results based on SS/PBCH block, as described in 5.5.3.3;
  2> if at least one measId included in the measIdList within VarMeasConfig contains an rsType set to csi-rs:
    3> if at least one measId included in the measIdList within VarMeasConfig contains a reportQuantityRS-Indexes and maxNrofRS-IndexesToReport and contains an rsType set to csi-rs:
      4> derive layer 3 filtered RSRP and RSRQ per beam for the serving cell based on CSI-RS, as described in 5.5.3.3a;
    3> derive serving cell measurement results based on CSI-RS, as described in 5.5.3.3;
[ . . . ]

5.5.3.3 Derivation of Cell Measurement Results

The network may configure the UE to derive RSRP, RSRQ and SINR measurement results per cell associated to NR measurement objects based on parameters configured in the measObject (e.g. maximum number of beams to be averaged and beam consolidation thresholds) and in the reportConfig (rsType to be measured, SS/PBCH block or CSI-RS).

The UE shall:
1> for each cell measurement quantity to be derived based on SS/PBCH block:
  2> if nrofSS-BlocksToAverage in the associated measObject is not configured; or
  2> if absThreshSS-BlocksConsolidation in the associated measObject is not configured; or
  2> if the highest beam measurement quantity value is below or equal to absThreshSS-BlocksConsolidation:
    3> derive each cell measurement quantity based on SS/PBCH block as the highest beam measurement quantity value, where each beam measurement quantity is described in TS 38.215 [9];
  2> else:
    3> derive each cell measurement quantity based on SS/PBCH block as the linear power scale average of the highest beam measurement quantity values above absThreshSS-BlocksConsolidation where the total number of averaged beams shall not exceed nrofSS-BlocksToAverage;
  2> apply layer 3 cell filtering as described in 5.5.3.2;
1> for each cell measurement quantity to be derived based on CSI-RS:
  2> consider a CSI-RS resource to be applicable for deriving cell measurements when the concerned CSI-RS resource is included in the csi-rs-CellMobility including the physCellId of the cell in the CSI-RS-ResourceConfigMobility in the associated measObject;
  2> if nrofCSI-RS-ResourcesToAverage in the associated measObject is not configured; or
  2> if absThreshCSI-RS-Consolidation in the associated measObject is not configured; or
  2> if the highest beam measurement quantity value is below or equal to absThreshCSI-RS-Consolidation:
    3> derive each cell measurement quantity based on applicable CSI-RS resources for the cell as the highest beam measurement quantity value, where each beam measurement quantity is described in TS 38.215 [9];
  2> else:
    3> derive each cell measurement quantity based on CSI-RS as the linear power scale average of the highest beam measurement quantity values above absThreshCSI-RS-Consolidation where the total number of averaged beams shall not exceed nrofCSI-RS-ResourcesToAverage;
  2> apply layer 3 cell filtering as described in 5.5.3.2.

5.5.3.3a Derivation of Layer 3 Beam Filtered Measurement
The UE shall:
1> for each layer 3 beam filtered measurement quantity to be derived based on SS/PBCH block;
  2> derive each configured beam measurement quantity based on SS/PBCH block as described in TS 38.215 [9], and apply layer 3 beam filtering as described in 5.5.3.2;
1> for each layer 3 beam filtered measurement quantity to be derived based on CSI-RS;
  2> derive each configured beam measurement quantity based on CSI-RS as described in TS 38.215 [9], and apply layer 3 beam filtering as described in 5.5.3.2.
[ . . . ]

5.5.5 Measurement Reporting
5.5.5.1 General

The purpose of this procedure is to transfer measurement results from the UE to the network. The UE shall initiate this procedure only after successful security activation.

For the measId for which the measurement reporting procedure was triggered, the UE shall set the measResults within the MeasurementReport message as follows:
1> set the measId to the measurement identity that triggered the measurement reporting;
1> set the measResultServingCell within measResultServingMOList to include, for each NR serving cell that is configured with servingCellMO, RSRP, RSRQ and the available SINR, derived based on the rsType if indicated in the associated reportConfig, otherwise based on SSB if available, otherwise based on CSI-RS;
1> set the servCellId within measResultServingMOList to include each NR serving cell that is configured with servingCellMO, if any;
1> if the reportConfig associated with the measId that triggered the measurement reporting includes reportQuantityRS-Indexes and maxNrofRS-IndexesToReport:
  2> for each serving cell configured with servingCellMO, include beam measurement information according to the associated reportConfig as described in 5.5.5.2;
[ . . . ]

5.5.5.2 Reporting of Beam Measurement Information

For beam measurement information to be included in a measurement report the UE shall:
[ . . . ]
1> set rsIndexResults to include up to maxNrofRS-IndexesToReport SS/PBCH block indexes or CSI-RS indexes in order of decreasing sorting quantity as follows:
  2> if the measurement information to be included is based on SS/PBCH block:
    3> include within resultsSSB-Indexes the index associated to the best beam for that SS/PBCH block sorting quantity and if absThreshSS-Blocks-Consolidation is included in the VarMeasConfig for the measObject associated to the cell for which beams are to be reported, the remaining beams whose sorting quantity is above absThreshSS-BlocksConsolidation;
    3> if includeBeamMeasurements is configured, include the SS/PBCH based measurement results for the quantities in reportQuantityRS-Indexes set to TRUE for each SS/PBCH blockindex;
  2> else if the beam measurement information to be included is based on CSI-RS:
    3> include within resultsCSI-RS-Indexes the index associated to the best beam for that CSI-RS sorting quantity and, if absThreshCSI-RS-Consolidation is included in the VarMeasConfig for the measObject associated to the cell for which beams are to be reported, the remaining beams whose sorting quantity is above absThreshCSI-RS-Consolidation;
    3> if includeBeamMeasuretmentsis configured, include the CSI-RS based measurement results for the quantities in reportQuantityRS-Indexes set to TRUE for each CSI-RS index.

MeasResults

The IE MeasResults covers measured results for intra-frequency, inter-frequency, and inter-RAT mobility.

MeasResults Information Element

```
-- ASN1START
-- TAG-MEAS-RESULTS-START
MeasResults ::=                     SEQUENCE {
    measId                              MeasId,
    measResultServingMOList             MeasResultServMOList,
    measResultNeighCells                CHOICE {
        measResultListNR                    MeasResultListNR,
        ...,
        measResultListEUTRA                 MeasResultListEUTRA
    }
OPTIONAL,
    ...
}
MeasResultServMOList ::=            SEQUENCE (SIZE (1..maxNrofServingCells)) OF
MeasResultServMO
MeasResultServMO ::=                SEQUENCE {
    servCellId                          ServCellIndex,
    measResultServingCell               MeasResultNR,
    measResultBestNeighCell             MeasResultNR
OPTIONAL,
    ...
}
MeasResultListNR ::=                SEQUENCE (SIZE (1..maxCellReport)) OF MeasResultNR
MeasResultNR ::=                    SEQUENCE {
    physCellId                          PhysCellId
OPTIONAL,
    measResult                          SEQUENCE {
        cellResults                         SEQUENCE{
            resultsSSB-Cell                     MeasQuantityResults
OPTIONAL,
            resultsCSI-RS-Cell                  MeasQuantityResults
OPTIONAL
        },
        rsIndexResults                      SEQUENCE{
            resultsSSB-Indexes                  ResultsPerSSB-IndexList
OPTIONAL,
            resultsCSI-RS-Indexes               ResultsPerCSI-RS-IndexList
OPTIONAL
        }
OPTIONAL
    },
    ...,
    [[
    cgi-Info                            CGI-Info
OPTIONAL
    ]]
}
[...]
MeasQuantityResults ::=             SEQUENCE {
    rsrp                                RSRP-Range
OPTIONAL,
    rsrq                                RSRQ-Range
OPTIONAL,
    sinr                                SINR-Range
OPTIONAL
}
[...]
ResultsPerSSB-IndexList::=          SEQUENCE (SIZE (1..maxNrofIndexesToReport2)) OF
ResultsPerSSB-Index
ResultsPerSSB-Index ::=             SEQUENCE {
    ssb-Index                           SSB-Index,
    ssb-Results                         MeasQuantityResults
OPTIONAL
}
ResultsPerCSI-RS-IndexList::=       SEQUENCE (SIZE (1..maxNrofIndexesToReport2)) OF
ResultsPerCSI-RS-Index
ResultsPerCSI-RS-Index ::=          SEQUENCE {
    csi-RS-Index                        CSI-RS-Index,
    csi-RS-Results                      MeasQuantityResults
OPTIONAL
}
-- TAG-MEAS-RESULTS-STOP
-- ASN1STOP
```

Figure 6:
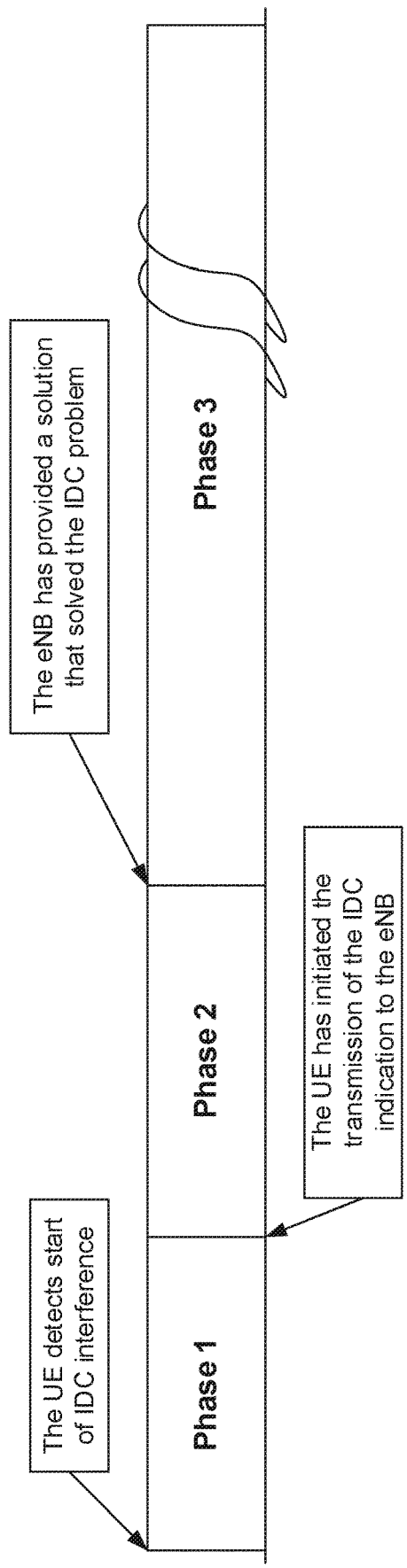
FIG. 6 is a diagram illustrating an exemplary scenario associated with In-Device Coexistence (IDC) according to one exemplary embodiment.

3GPP TS 36.300 V15.4.0 introduces In-device coexistence interference and IDC indication. Notably, Figure 23.4.2-1 of Section 23.4.2 of 3GPP TS 36.300 V15.4.0, entitled "Different phases of IDC interference related operations by UE", is reproduced herein as FIG. 6.

23.4 Interference Avoidance for in-Device Coexistence 23.4.1 Problems

In order to allow users to access various networks and services ubiquitously, an increasing number of UEs are equipped with multiple radio transceivers. For example, a UE may be equipped with LTE, WiFi, and Bluetooth transceivers, and GNSS receivers. Due to extreme proximity of multiple radio transceivers within the same UE operating on adjacent frequencies or sub-harmonic frequencies, the interference power coming from a transmitter of the collocated radio may be much higher than the actual received power level of the desired signal for a receiver. This situation causes In-Device Coexistence (IDC) interference and is referred to as IDC problems. The challenge lies in avoiding or minimizing IDC interference between those collocated radio transceivers, as current state-of-the-art filter technology might not provide sufficient rejection for certain scenarios (see TR 36.816 [50]). IDC problem can happen when the UE (intends to) uses WLAN on the overlapped carrier/band or adjacent carrier/band to the unlicensed carrier used for LAA operation, e.g. when related UE hardware components, such as antennas, are shared between LAA and WLAN operations. If there is a risk of IDC problem which cannot be avoided (e.g. by level of regulation), the IDC functionality for a UE should be configured by the eNB when the UE is configured for LAA operation.

23.4.2 Solutions

When a UE experiences IDC problems that it cannot solve by itself and a network intervention is required, it sends an IDC indication via dedicated RRC signalling to report the IDC problems to the eNB. The UE may rely on existing LTE measurements and/or UE internal coordination to assess the interference and the details are left up to UE implementation.

> NOTE: For instance, the interference is applicable over several subframes/slots where not necessarily all the subframes/slots are affected and consists of interference caused by the aggressor radio to the victim radio during either active data exchange or upcoming data activity which is expected in up to a few hundred milliseconds.

A UE that supports IDC functionality indicates related capabilities to the network, and the network can then configure by dedicated signalling whether the UE is allowed to send an IDC indication. The IDC indication can only be triggered for frequencies for which a measurement object is configured and when:

- for the primary frequency, the UE is experiencing IDC problems that it cannot solve by itself;
- for a secondary frequency, regardless of the activation state of the corresponding SCell, the UE is experiencing or expects to experience upon activation IDC problems that it cannot solve by itself;
- for a non-serving frequency, the UE expects to experience IDC problems that it cannot solve by itself if that non-serving frequency becomes a serving one.

When notified of IDC problems through an IDC indication from the UE, the eNB can choose to apply a Frequency Division Multiplexing (FDM) solution or a Time Division Multiplexing (TDM) solution:

- The basic concept of an FDM solution is to move the LTE signal away from the ISM band by e.g., performing inter-frequency handover within E-UTRAN, removing SCells from the set of serving cells or de-activation of affected SCells, or in case of uplink CA operations, allocate uplink PRB resources on CC(s) whose inter-modulation distortion and harmonics does not fall into the frequency range of the victim system receiver.
- The basic concept of a TDM solution is to ensure that transmission of a radio signal does not coincide with reception of another radio signal. LTE DRX mechanism is used to provide TDM patterns (i.e. periods during which the LTE UE may be scheduled or is not scheduled) to resolve the IDC issues. DRX based TDM solution should be used in a predictable way, i.e. the eNB should ensure a predictable pattern of unscheduled periods by means of e.g. DRX mechanism or de-activation of affected SCells.

To assist the eNB in selecting an appropriate solution, all necessary/available assistance information for both FDM and TDM solutions is sent together in the IDC indication to the eNB. The IDC assistance information contains the list of E-UTRA carriers suffering from IDC problems, the direction of the interference and, depending on the scenario (see TR 36.816 [50]), it also contains TDM patterns or parameters to enable appropriate DRX configuration for TDM solutions on the serving E-UTRA carrier. Furthermore, the IDC indication can also be configured to include uplink CA related assistance information containing the victim system as well as the list of supported uplink CA combinations suffering from IDC problems. Furthermore, the IDC indication can also be configured to indicate that the cause of IDC problems is hardware sharing between LAA and WLAN operation, in which case the UE may omit the TDM assistance information. The IDC indication is also used to update the IDC assistance information, including for the cases when the UE no longer suffers from IDC problems. In case of inter-eNB handover, the IDC assistance information is transferred from the source eNB to the target eNB.

Figure 7:
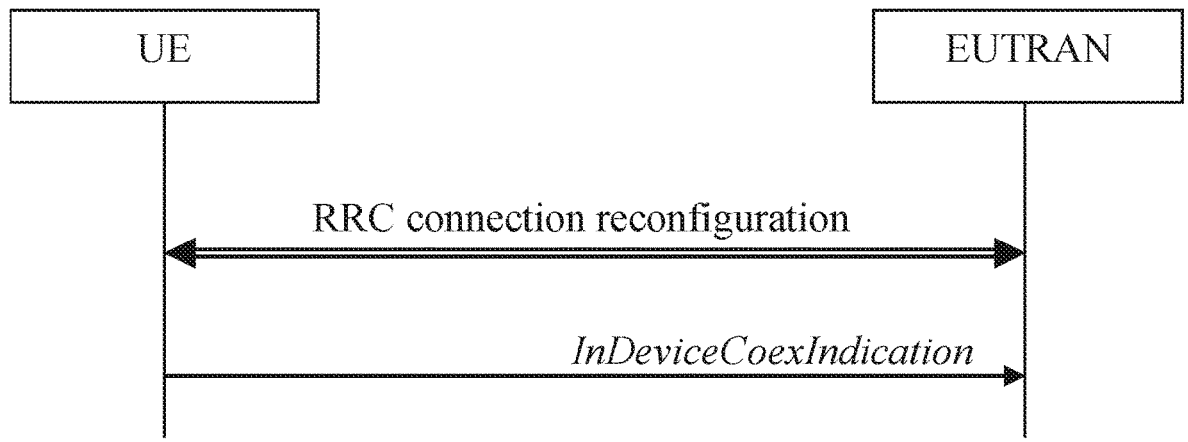
FIG. 7 is a diagram illustrating an exemplary scenario associated with IDC according to one exemplary embodiment.

3GPP TS 36.331 V15.2.2 introduces in-device coexistence indication and the content of InDeviceCoexIndication. Notably, Figure 5.6.9.1-1 of Section 5.6.9.1 of 3GPP TS 36.331 V15.2.2, entitled "In-device coexistence indication", is reproduced herein as FIG. 7.

5.6.9 In-Device Coexistence Indication 5.6.9.1 General

The purpose of this procedure is to inform E-UTRAN about (a change of) the In-Device Coexistence (IDC) problems experienced by the UE in RRC_CONNECTED, as described in TS 36.300 [9], and to provide the E-UTRAN with information in order to resolve them.

5.6.9.2 Initiation

A UE capable of providing IDC indications may initiate the procedure when it is configured to provide IDC indications and upon change of IDC problem information.

Upon initiating the procedure, the UE shall:

1> if configured to provide IDC indications:
  2> if the UE did not transmit an InDeviceCoexIndication message since it was configured to provide IDC indications:
    3> if on one or more frequencies for which a measObjectEUTRA is configured, the UE is experiencing IDC problems that it cannot solve by itself; or
    3> if configured to provide IDC indications for UL CA; and if on one or more supported UL CA combination comprising of carrier frequencies for which a measurement object is configured, the UE is experiencing IDC problems that it cannot solve by itself:
- 4> initiate transmission of the InDeviceCoexIndication message in accordance with 5.6.9.3;

2> else:
- 3> if the set of frequencies, for which a measObjectEUTRA is configured and on which the UE is experiencing IDC problems that it cannot solve by itself, is different from the set indicated in the last transmitted InDeviceCoexIndication message; or
- 3> if for one or more of the frequencies in the previously reported set of frequencies, the interferenceDirection is different from the value indicated in the last transmitted InDeviceCoexIndication message; or
- 3> if the TDM assistance information is different from the assistance information included in the last transmitted InDeviceCoexIndication message; or
- 3> if configured to provide IDC indications for UL CA; and if the victimSystemType is different from the value indicated in the last transmitted InDeviceCoexIndication message; or
- 3> if configured to provide IDC indications for UL CA; and if the set of supported UL CA combinations on which the UE is experiencing IDC problems that it cannot solve by itself and that the UE includes in affectedCarrierFreqCombList according to 5.6.9.3, is different from the set indicated in the last transmitted InDeviceCoexIndication message:
  - 4> initiate transmission of the InDeviceCoexIndication message in accordance with 5.6.9.3;

NOTE 1: The term "IDC problems" refers to interference issues applicable across several subframes/slots where not necessarily all the subframes/slots are affected.

NOTE 2: For the frequencies on which a serving cell or serving cells is configured that is activated, IDC problems consist of interference issues that the UE cannot solve by itself, during either active data exchange or upcoming data activity which is expected in up to a few hundred milliseconds.

For frequencies on which a SCell or SCells is configured that is deactivated, reporting IDC problems indicates an anticipation that the activation of the SCell or SCells would result in interference issues that the UE would not be able to solve by itself.

For a non-serving frequency, reporting IDC problems indicates an anticipation that if the non-serving frequency or frequencies became a serving frequency or serving frequencies then this would result in interference issues that the UE would not be able to solve by itself.

5.6.9.3 Actions Related to Transmission of InDeviceCoexIndication Message

The UE shall set the contents of the InDeviceCoexIndication message as follows:
1> if there is at least one E-UTRA carrier frequency, for which a measurement object is configured, that is affected by IDC problems:
- 2> include the field affectedCarrierFreqList with an entry for each affected E-UTRA carrier frequency for which a measurement object is configured;
- 2> for each E-UTRA carrier frequency included in the field affectedCarrierFreqList, include interferenceDirection and set it accordingly;
- 2> include Time Domain Multiplexing (TDM) based assistance information, unless idc-HardwareSharingIndication is configured and the UE has no Time Doman Multiplexing based assistance information that could be used to resolve the IDC problems:
  - 3> if the UE has DRX related assistance information that could be used to resolve the IDC problems:
    - 4> include drx-CycleLength, drx-Offset and drx-ActiveTime;
  - 3> else (the UE has desired subframe reservation patterns related assistance information that could be used to resolve the IDC problems):
    - 4> include idc-SubframePatternList;
  - 3> use the MCG as timing reference if TDM based assistance information regarding the SCG is included;
1> if the UE is configured to provide UL CA information and there is a supported UL CA combination comprising of carrier frequencies for which a measurement object is configured, that is affected by IDC problems:
- 2> include victimSystemType in ul-CA-AssistanceInfo;
- 2> if the UE sets victimSystemType to wlan or Bluetooth:
  - 3> include affectedCarrierFreqCombList in ul-CA-AssistanceInfo with an entry for each supported UL CA combination comprising of carrier frequencies for which a measurement object is configured, that is affected by IDC problems;
- 2> else:
  - 3> optionally include affectedCarrierFreqCombList in ul-CA-AssistanceInfo with an entry for each supported UL CA combination comprising of carrier frequencies for which a measurement object is configured, that is affected by IDC problems;
1> if idc-HardwareSharingIndication is configured, and there is at least one E-UTRA carrier frequency, for which a measurement object is configured, the UE is experiencing hardware sharing problems that it cannot solve by itself:
- 2> include the hardwareSharingProblem and set it accordingly;

[ . . . ]

6.2.2 Message Definitions

[ . . . ]

InDeviceCoexIndication

The InDeviceCoexIndication message is used to inform E-UTRAN about IDC problems which can not be solved by the UE itself, as well as to provide information that may assist E-UTRAN when resolving these problems.

[ . . . ]

InDeviceCoexIndication Message

-- ASN1START
InDeviceCoexIndication-r11 ::= SEQUENCE {
    criticalExtensions        CHOICE {
        c1                    CHOICE {

```
                inDeviceCoexIndication-r11            InDeviceCoexIndication-r11-IEs,
                spare3 NULL, spare2 NULL, spare1 NULL
            },
            criticalExtensionsFuture                 SEQUENCE { }
        }
    }
    InDeviceCoexIndication-r11-IEs ::=           SEQUENCE {
        affectedCarrierFreqList-r11              AffectedCarrierFreqList-r11               OPTIONAL,
        tdm-AssistanceInfo-r11                   TDM-AssistanceInfo-r11                    OPTIONAL,
        lateNonCriticalExtension                 OCTET STRING                              OPTIONAL,
        nonCriticalExtension                     InDeviceCoexIndication-v11d0-IEs          OPTIONAL
    }
    InDeviceCoexIndication-v11d0-IEs ::=         SEQUENCE {
        ul-CA-AssistanceInfo-r11                 SEQUENCE {
            affectedCarrierFreqCombList-r11          AffectedCarrierFreqCombList-r11       OPTIONAL,
            victimSystemType-r11                     VictimSystemType-r11
        }                                                                                  OPTIONAL,
        nonCriticalExtension                     InDeviceCoexIndication-v1310-IEs
        OPTIONAL
    }
    InDeviceCoexIndication-v1310-IEs ::=         SEQUENCE {
        affectedCarrierFreqList-v1310            AffectedCarrierFreqList-v1310             OPTIONAL,
        affectedCarrierFreqCombList-r13          AffectedCarrierFreqCombList-r13           OPTIONAL,
        nonCriticalExtension                     InDeviceCoexIndication-v1360-IEs          OPTIONAL
    }
    InDeviceCoexIndication-v1360-IEs ::=         SEQUENCE {
        hardwareSharingProblem-r13               ENUMERATED {true}                         OPTIONAL,
        nonCriticalExtension                     SEQUENCE { }                              OPTIONAL
    }
    AffectedCarrierFreqList-r11 ::= SEQUENCE (SIZE (1..maxFreqIDC-r11)) OF AffectedCarrierFreq-r11
    AffectedCarrierFreqList-v1310 ::= SEQUENCE (SIZE (1..maxFreqIDC-r11)) OF AffectedCarrierFreq-v1310
    AffectedCarrierFreq-r11 ::=                  SEQUENCE {
        carrierFreq-r11                          MeasObjectId,
        interferenceDirection-r11                ENUMERATED {eutra, other, both, spare}
    }
    AffectedCarrierFreq-v1310 ::=                SEQUENCE {
        carrierFreq-v1310                        MeasObjectId-v1310                        OPTIONAL
    }
    AffectedCarrierFreqCombList-r11 ::=          SEQUENCE (SIZE (1..maxCombIDC-r11)) OF
    AffectedCarrierFreqComb-r11
    AffectedCarrierFreqCombList-r13 ::=          SEQUENCE (SIZE (1..maxCombIDC-r11)) OF
    AffectedCarrierFreqComb-r13
    AffectedCarrierFreqComb-r11 ::=              SEQUENCE (SIZE (2..maxServCell-r10)) OF MeasObjectId
    AffectedCarrierFreqComb-r13 ::=              SEQUENCE (SIZE (2..maxServCell-r13)) OF MeasObjectId-r13
    TDM-AssistanceInfo-r11 ::=                   CHOICE {
        drx-AssistanceInfo-r11                       SEQUENCE {
            drx-CycleLength-r11                          ENUMERATED {sf40, sf64, sf80, sf128, sf160,
                                                             sf256, spare2, spare1},
            drx-Offset-r11                               INTEGER (0..255) OPTIONAL,
            drx-ActiveTime-r11                           ENUMERATED {sf20, sf30, sf40, sf60, sf80,
                                                             sf100, spare2, spare1}
        },
        idc-SubframePatternList-r11              IDC-SubframePatternList-r11,
        ...
    }
    IDC-SubframePatternList-r11 ::=          SEQUENCE (SIZE (1..maxSubframePatternIDC-r11)) OF IDC-
    SubframePattern-r11
    IDC-SubframePattern-r11 ::=              CHOICE {
        subframePatternFDD-r11                   BIT STRING (SIZE (4)),
        subframePatternTDD-r11                   CHOICE {
            subframeConfig0-r11                      BIT STRING (SIZE (70)),
            subframeConfig1-5-r11                    BIT STRING (SIZE (10)),
            subframeConfig6-r11                      BIT STRING (SIZE (60))
        },
        ...
    }
    VictimSystemType-r11 ::= SEQUENCE {
        gps-r11                                  ENUMERATED {true}                         OPTIONAL,
        glonass-r11                              ENUMERATED {true}                         OPTIONAL,
        bds-r11                                  ENUMERATED {true}                         OPTIONAL,
        galileo-r11                              ENUMERATED {true}                         OPTIONAL,
        wlan-r11                                 ENUMERATED {true}                         OPTIONAL,
        bluetooth-r11                            ENUMERATED {true}                         OPTIONAL
    }
    -- ASN1STOP
```

| InDeviceCoexIndication field descriptions |
|---|
| AffectedCarrierFreq<br>If carrierFreq-v1310 is included, carrierFreq-r11 is ignored by eNB.<br>affectedCarrierFreqCombList<br>Indicates a list of E-UTRA carrier frequencies that are affected by IDC problems due to Inter-Modulation Distortion and harmonics from E-UTRA when configured with UL CA. affectedCarrierFreqCombList-r13 is used when more than 5 serving cells are configured or affected combinations contain MeasObjectId larger than 32. If affectedCarrierFreqCombList-r13 is included, affectedCarrierFreqCombList-r11 shall not be included.<br>affectedCarrierFreqList<br>List of E-UTRA carrier frequencies affected by IDC problems. If E-UTRAN includes affectedCarrierFreqList-v1310 it includes the same number of entries, and listed in the same order, as in affectedCarrierFreqList-r11.<br>drx-ActiveTime<br>Indicates the desired active time that the E-UTRAN is recommended to configure. Value in number of subframes. Value sf20 corresponds to 20 subframes, sf30 corresponds to 30 subframes and so on.<br>drx-CycleLength<br>Indicates the desired DRX cycle length that the E-UTRAN is recommended to configure. Value in number of subframes. Value sf40 corresponds to 40 subframes, sf64 corresponds to 64 subframes and so on.<br>drx-Offset<br>Indicates the desired DRX starting offset that the E-UTRAN is recommended to configure. The UE shall set the value of drx-Offset smaller than the value of drx-CycleLength. The starting frame and subframe satisfy the relation: [(SFN * 10) + subframe number] modulo (drx-CycleLength) = drx-Offset.<br>hardwareSharingProblem<br>Indicates whether the UE has hardware sharing problems that the UE cannot solve by itself. The field is present (i.e. value true), if the UE has such hardware sharing problems. Otherwise the field is absent.<br>idc-SubframePatternList |

| InDeviceCoexIndication field descriptions |
|---|
| A list of one or more subframe patterns indicating which HARQ process E-UTRAN is requested to abstain from using. Value 0 indicates that E-UTRAN is requested to abstain from using the subframe. For FDD, the radio frame in which the pattern starts (i.e. the radio frame in which the first/leftmost bit of the subframePatternFDD corresponds to subframe #0) occurs when SFN mod 2 = 0. For TDD, the first/leftmost bit corresponds to the subframe #0 of the radio frame satisfying SFN mod x = 0, where x is the size of the bit string divided by 10. The UE shall indicate a subframe pattern that follows HARQ time line, as specified in TS 36.213 [23], i.e, if a subframe is set to 1 in the subframe pattern, also the corresponding subframes carrying the potential UL grant [23, 8.0], the UL HARQ retransmission [23, 8.0] and the DL/UL HARQ feedback [23, 7.3, 8.3 and 9.1.2] shall be set to 1.<br>interferenceDirection<br>Indicates the direction of IDC interference. Value eutra indicates that only E-UTRA is victim of IDC interference, value other indicates that only another radio is victim of IDC interference and value both indicates that both E-UTRA and another radio are victims of IDC interference. The other radio refers to either the ISM radio or GNSS (see 3GPP TR 36.816 [63]).<br>victimSystemType<br>Indicate the list of victim system types to which IDC interference is caused from E-UTRA when configured with UL CA. Value gps, glonass, bds and galileo indicates the type of GNSS. Value wlan indicates WLAN and value bluetooth indicates Bluetooth.[ . . . ] |

3GPP TS 38.331 V15.4.0 introduces configuration of reference signals of TCI states.

TCI-State

The TCI-State IE associates one or two DL reference signals with a corresponding quasi-colocation (QCL) type.

TCI-State Information Element

```
-- ASN1START
-- TAG-TCI-STATE-START
TCI-State ::=           SEQUENCE {
    tci-StateId         TCI-StateId,
    qcl-Type1           QCL-Info,
    qcl-Type2           QCL-Info              OPTIONAL,  -- Need R
    ...
}
QCL-Info ::=            SEQUENCE {
    cell                ServCellIndex         OPTIONAL,  -- Need R
    bwp-Id              BWP-Id                OPTIONAL,  -- Cond CSI-RS-
Indicated
    referenceSignal     CHOICE {
        csi-rs              NZP-CSI-RS-ResourceId,
        ssb                 SSB-Index
    },
    qcl-Type            ENUMERATED {typeA, typeB, typeC, typeD},
    ...
}
-- TAG-TCI-STATE-STOP
-- ASN1STOP
```

| QCL-Info field descriptions |
|---|
| bwp-Id<br>The DL BWP which the RS is located in.<br>cell<br>The carrier which the RS is located in. If the field is absent, it applies to the serving cell in which the TCI-State is configured. The RS can be located on a serving cell other than the serving cell in which the TCI-State is configured only if the qcl-Type is configured as typeD. See TS 38.214 section 5.1.5.<br>referenceSignal<br>Reference signal with which quasi-collocation information is provided as specified in TS 38.3214 subclause 5.1.5.<br>qcl-Type<br>QCL type as specified in TS 38.214 subclause 5.1.5. |

TCI-StateId

The IE TCI-StateId is used to identify one TCI-State configuration.

In the current LTE specification, in order to allow users to access various networks and services ubiquitously, a number of UEs are equipped with multiple radio transceivers (e.g., LTE, WiFi, and/or Bluetooth transceivers). Due to extreme proximity of multiple radio transceivers within the same UE operating on adjacent frequencies or sub-harmonic frequencies, the interference power coming from a transmitter of the collocated radio may be much higher than the actual received power level of the desired signal for a receiver. This situation causes In-Device Coexistence (IDC) interference and is referred to as IDC problems. One or more IDC problems can happen when the UE uses (and/or intends to use) wireless local area network (WLAN) on the overlapped carrier/band or adjacent carrier/band to the unlicensed carrier used for License Assisted Access (LAA) operation.

For example, a UE (e.g., a single UE) may have multiple radio transceivers operating on adjacent frequencies and/or sub-harmonic frequencies. A transmitter of the multiple radio transceivers may introduce interference to a receiver of the multiple radio transceivers, where the interference has an interference power that is higher (and/or less than) than a power level of a desired signal for the receiver. The interference may correspond to IDC interference. The IDC interference may be referred to as an IDC problem.

In LTE, when a UE experiences one or more IDC problems that may not (and/or cannot) be solved by the UE and a network intervention is required, the UE sends an IDC indication via dedicated RRC signaling to report the one or more IDC problems to the eNB.

UEs operating in NR may also experience IDC problems. For example, a UE may experience one or more IDC problems when using one or more beams for one or more transmissions in a serving cell, while one or more other beams for one or more transmissions in the serving cell (e.g., the same serving cell) are not affected with one or more IDC problems (e.g., the UE may not experience an IDC problem when using the one or more other beams for one or more transmissions in the serving cell).

Figure 8:
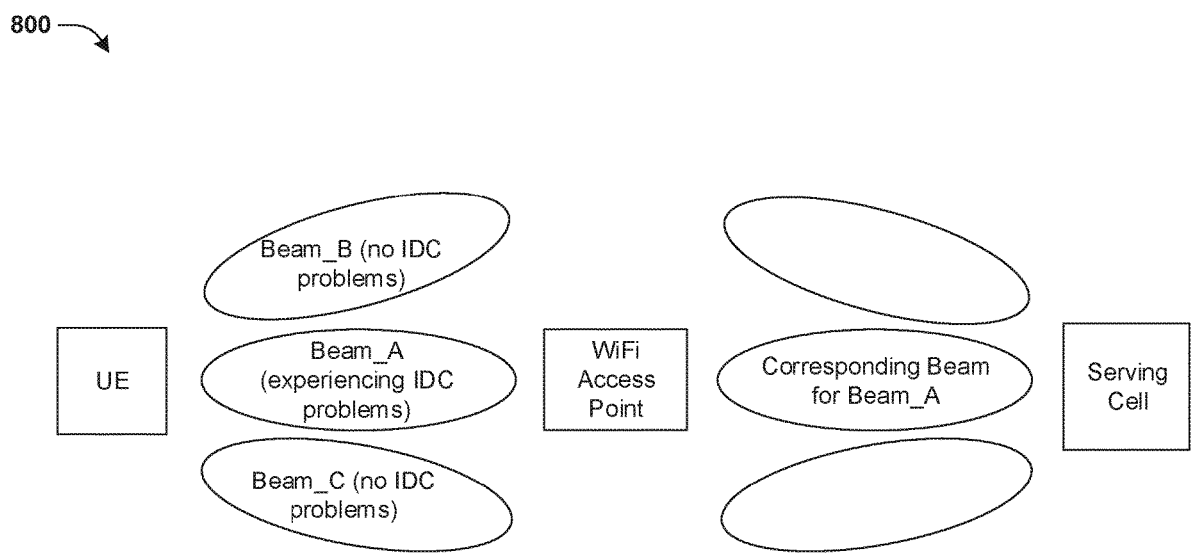
FIG. 8 is a diagram illustrating an exemplary scenario associated with beam selection according to one exemplary embodiment.

FIG. 8 illustrates an exemplary scenario 800 associated with beam selection by a UE. The UE is configured and/or indicated with three beams (Beam_A, Beam_B, and Beam_C) for communicating with a serving cell. In some embodiments, the UE selects a beam (Beam_A) to perform communications with the serving cell (e.g., perform transmissions to the serving cell and/or receptions from the serving cell). The UE may perform WiFi communications with a WiFi Access Point (e.g., the UE may perform transmissions to the WiFi Access Point and/or receptions from the WiFi Access Point). The UE may experience IDC problems (e.g., IDC interference) caused by the WiFi communications with the WiFi Access Point if the UE selects Beam_A to perform communication with the serving cell. The IDC problems may not (and/or cannot) be solved by the UE by itself (e.g., network intervention may be required for the UE to perform communications with the serving cell without experiencing IDC problems). The UE would not be affected by IDC problems if the UE selects one or more other beams (e.g., Beam_B and/or Beam_C) for communication with the serving cell. In some systems, the UE would transmit an IDC indication to a gNB to solve the IDC problems of the exemplary scenario 800. Responsive to receiving the IDC indication, the gNB may initiate a handover and/or deactivate the serving cell for the UE, causing unnecessary handover procedures and/or a waste of resource(s).

Another issue may occur when a UE performs beam reporting to a network when operating in a spectrum with possible IDC problems. According to some Channel State Information (CSI) reporting procedures, if the UE is configured with a CSI-ReportConfig with the higher layer parameter reportQuantity set to 'cri-RSRP' or 'ssb-Index-RSRP', the UE reports a number of reference signal resources (e.g., nrofReportedRS), associated with Channel State Information Reference Signal (CSI-RS) Resource Indicator (CRI) and/or Synchronization Signal (SS)/Physical Broadcast Channel (PBCH) Block (SSB) Resource indicator (SSBRI), and/or a measured Reference Signal Received Power (RSRP) value (associated with the number of reference signal resources, the CRI and/or the SSBRI) in a single report. In some embodiments, the UE performs beam reporting to inform the network about suitable beams for communication. The network may schedule the UE to perform communication using beams based on beam reports (e.g., the network may schedule the UE to perform communications using one or more beams with qualities greater than qualities of other beams). When the UE uses (and/or intends to use) WLAN on a carrier/band that is overlapped with and/or adjacent to an unlicensed carrier used for NR-unlicensed (NR-U) operation, data reception (and/or data transmission) from certain directions (e.g., beams) may be interfered with due to one or more IDC problems (e.g., IDC interference may be introduced to the data reception and/or the data transmission). Some systems for performing beam reporting do not take interference from other transceivers in the UE into consideration. For example, such systems provide for a beam report that does not take interference from other transceivers in the UE into consideration. Accordingly, in such systems, the UE may report a beam with IDC problems to the network, and the UE may suffer from heavy In-Device interference if the network schedules the UE to use the beam with IDC problems.

Another issue occurs when a UE performs beam measurement reporting to a network. According to the RRC specification described in TS 38.331 V15.4.0, a UE includes at most n (e.g., maxNrofRS-IndexesToReport) beam information (e.g., SSB indexes and/or CSI-RS indexes) in a measurement report (e.g., rsIndexResults) in a decreasing order based on a sorting quantity (e.g., RSRP, Reference Signal Received Quality (RSRQ) and/or signal-to-noise and interference ratio (SINR)). For example, the UE includes 10 beams with highest measured RSRPs (and/or the RSRPs are above a configured threshold) among measured beams. However, sorting and/or arranging performed by the UE does not consider potential IDC problems that may occur in certain beams (e.g., the UE may sort and/or arrange indications of the beams without taking potential IDC problems associated with the beams into account). Accordingly, the UE may report, to the network, beams with high sorting quantity but having heavy interference from other transceivers in the same UE. The network may assign the UE to receive data using beams based on the beam report without taking into account potential IDC problems associated with the beams. Alternatively and/or additionally, the UE may perform beam measurement reporting for neighboring cells to the network. In a scenario where the beam measurement report includes beams with IDC problems, if the network requires the UE to perform reconfiguration with sync on a neighboring cell, the network may configure random access procedure resources on beams with high measured received power (e.g., RSRP) but with IDC problems.

The triggering of measurement reports may also be affected by the beam measurement information of beams with IDC problems.

One or more techniques are provided herein that provide solutions to one or more of the foregoing situations, such as a situation where a UE is configured and/or scheduled to receive data using beams with IDC problems.

In a first concept of the present disclosure, a UE reports a signal indicating beams with one or more IDC problems and/or one or more potential IDC problems. For example, the UE may transmit the signal indicating one or more beams affected by one or more IDC problems to a network.

The UE may transmit the signal when there are one or more affected carrier frequencies that are affected by one or more IDC problems. In some embodiments, the UE transmits the signal responsive to identifying the one or more affected carrier frequencies that are affected by one or more IDC problems. In some embodiments, the UE transmits the signal based on a determination that the one or more affected carrier frequencies are affected by one or more IDC problems. In some embodiments, the signal indicates one or more affected beams of each affected carrier frequency of the one or more affected carrier frequencies. In some embodiments, the UE may not transmit the signal when there is no carrier frequency affected by one or more IDC problems. For example, the UE may not transmit the signal based on a determination that there is no carrier frequency affected by one or more IDC problems.

Alternatively and/or additionally, the UE may transmit the signal when there are one or more affected bandwidth parts that are affected by one or more IDC problems. In some embodiments, the UE transmits the signal responsive to identifying the one or more affected bandwidth parts that are affected by one or more IDC problems. In some embodiments, the UE transmits the signal based on a determination that the one or more affected bandwidth parts are affected by one or more IDC problems. In some embodiments, the signal indicates one or more affected beams of each affected bandwidth part of the one or more affected bandwidth parts that are affected by one or more IDC problems.

Alternatively and/or additionally, the UE does not transmit the signal when one or more beams that are being used by the UE (e.g., one or more beams that are currently being used by the UE) are not affected by one or more IDC problems. A beam is currently used by the UE if the UE uses the beam to perform one or more communications with the network. In some embodiments, the UE does not transmit the signal responsive to a determination that the one or more beams are not affected by one or more IDC problems.

In some embodiments, the UE may report, via the signal, one or more indexes of one or more SSBs identifying one or more affected beams for each affected carrier frequency of the one or more affected carrier frequencies.

Alternatively and/or additionally, the UE may not report, via the signal, one or more indexes of one or more SSBs identifying one or more non-affected beams (not affected by one or more IDC problems) for each affected carrier frequency of the one or more affected carrier frequencies.

Alternatively and/or additionally, the UE may report, via the signal, one or more indexes of one or more CSI-RSs identifying one or more affected beams for each affected carrier frequency of the one or more affected carrier frequencies.

Alternatively and/or additionally, the UE may not report, via the signal, one or more indexes of one or more CSI-RSs identifying one or more non-affected beams (not affected by one or more IDC problems) for each affected carrier frequency of the one or more affected carrier frequencies.

In some embodiments, the UE may report one or more indexes of one or more reference signals configured by RRC.

The UE may report one or more indexes of one or more reference signals configured in at least one Transmission Configuration Indicator (TCI) state of one or more TCI states configured by RRC.

Alternatively and/or additionally, the UE may not report one or more indexes of one or more reference signals not configured in at least one TCI state of the one or more TCI states.

In some embodiments, the UE may report one or more indexes of one or more reference signals configured in a TCI state activated by a Medium Access Control (MAC) control element.

Alternatively and/or additionally, the UE may not report one or more indexes of one or more reference signals configured in a TCI state deactivated by a MAC control element.

In some embodiments, the UE may report one or more indexes of one or more reference signals configured in an activated TCI state mapped to a Downlink Control Information (DCI) field.

Alternatively and/or additionally, the UE may not report one or more indexes of one or more reference signals configured in a TCI state not mapped to a DCI field.

In some embodiments, the UE may not report one or more indexes of one or more reference signals not used in an affected bandwidth part.

Alternatively and/or additionally, the UE may report one or more indexes of one or more reference signals not used in an affected bandwidth part.

The UE may report one or more indexes of one or more reference signals selected in a random access procedure.

The UE may report one or more indexes of one or more reference signals selected in a beam failure recovery procedure.

In an example with respect to the exemplary scenario 800 of FIG. 8, the UE may transmit, to a network, a signal indicative of one or more IDC problems. The signal may comprise one or more reference signals (and/or one or more indexes of the one or more reference signals) associated with Beam_A (affected by one or more IDC problems). In some embodiments, the signal comprising the one or more reference signals (and/or the one or more indexes of the one or more reference signals) associated with Beam_A may be transmitted to the network based on a determination that Beam_A is affected by one or more IDC problems.

In an example with respect to the exemplary scenario 800 of FIG. 8, the UE may not transmit, to a network, a signal comprising one or more reference signals (and/or one or more indexes of the one or more reference signals) associated with Beam_B (that is not affected by one or more IDC problems). In some embodiments, a signal comprising the one or more reference signals (and/or the one or more indexes of the one or more reference signals) associated with Beam_B may not be transmitted to the network based on a determination that Beam_B is not affected by one or more IDC problems.

In an example with respect to the exemplary scenario 800 of FIG. 8, the UE may not transmit, to a network, a signal comprising one or more reference signals (and/or one or more indexes of the one or more reference signals) associated with Beam_C (that is not affected by one or more IDC problems). In some embodiments, a signal comprising the one or more reference signals (and/or the one or more indexes of the one or more reference signals) associated with Beam_C may not be transmitted to the network based on a determination that Beam_C is not affected by one or more IDC problems.

In a second concept of the present disclosure, a UE generates a measurement report for a cell based on whether a beam associated with a reference signal has one or more IDC problems and/or one or more potential IDC problems. For example, whether a reference signal information of the cell is included in the measurement report is based on whether a beam associated with a reference signal (associated with the reference signal information) has one or more IDC problems and/or one or more potential IDC problems.

In some embodiments, the measurement report does not include reference signal information (e.g., information associated with one or more reference signals), of the cell, associated with one or more beams having one or more IDC problems and/or one or more potential IDC problems. In some embodiments, reference signal information of the cell may not be included in the measurement report based on a determination that the reference signal information is associated with one or more beams having one or more IDC problems and/or one or more potential IDC problems.

In some embodiments, reference signal information of the cell may be included in the measurement report if a beam associated with the reference signal information (e.g., a beam associated with a reference signal associated with the reference signal information) does not have one or more IDC problems and/or one or more potential IDC problems. In some embodiments, reference signal information of the cell may be included in the measurement report based on a determination that the reference signal information is associated with one or more beams that do not have one or more IDC problems and/or one or more potential IDC problems.

In some embodiments, determining whether to include reference signal information in the measurement report is not based on whether a beam associated with the reference signal information has one or more IDC problems and/or one or more potential IDC problems. Accordingly, reference signal information associated with a beam having one or more IDC problems and/or one or more potential IDC problems may be included in the measurement report. Alternatively and/or additionally, determining whether to include reference signal information in the measurement report is based on at least whether a beam associated with the reference signal information has one or more IDC problems and/or one or more potential IDC problems. Accordingly, reference signal information associated with a beam having one or more IDC problems and/or one or more potential IDC problems may not be included (and/or is not included) in the measurement report at least based on a determination that a beam associated with the reference signal information (e.g., a beam associated with a reference signal associated with the reference signal information) has one or more IDC problems and/or one or more potential IDC problems.

In some embodiments, the UE may determine whether to include a reference signal in a measurement report at least based on one or more IDC problems and/or one or more potential IDC problems associated with the reference signal. In some embodiments, the UE may not include a reference signal in the measurement report if a beam associated with the reference signal has one or more IDC problems and/or one or more potential IDC problems. In some embodiments, the UE may not include the reference signal in the measurement report based on a determination that the beam associated with the reference signal has one or more IDC problems and/or one or more potential IDC problems. The UE may include a reference signal in the measurement report if a beam associated with the reference signal does not have one or more IDC problems and/or one or more potential IDC problems. In some embodiments, the UE may include the reference signal in the measurement report based on a determination that the beam associated with the reference signal does not have one or more IDC problems and/or one or more potential IDC problems.

In some embodiments, for beam measurement information based on SSB to be included in a measurement result, the UE considers RSRP as the sorting quantity. The UE may select and/or choose one or more SSB indexes, amounting to at most a maximum number of SSB indexes, from SSB indexes associated with a set of beams. In some embodiments, the one or more SSB indexes are selected and/or chosen for inclusion in the measurement result based on measured RSRP values associated with the set of beams. For example, the UE may select and/or choose the one or more SSB indexes for inclusion in the measurement result in order of decreasing measured RSRP value associated with each beam. In some embodiments, the set of beams comprises beams that are not affected by one or more IDC problems. In some embodiments, the one or more SSB indexes are ordered and/or arranged in the measurement report in order of decreasing measured RSRP values associated with one or more beams associated with the one or more SSB indexes.

Alternatively and/or additionally, for beam measurement information based on SSB to be included in a measurement report, the UE considers RSRP as the sorting quantity. The UE may select and/or choose one or more SSB indexes, amounting to at most a maximum number of SSB indexes, in order of decreasing measured RSRP value associated with each beam. In some embodiments, the one or more SSB indexes are ordered and/or arranged in the measurement report in order of decreasing RSRP values associated with one or more beams associated with the one or more SSB indexes.

Alternatively and/or additionally, a UE performs beam measurement on 3 SSBs (e.g., SSB_A, SSB_B, and SSB_C) and obtains (and/or determines) RSRP values for each SSB of the 3 SSBs. In some embodiments, the RSRP values for each SSB of the 3 SSBs are RSRP_A associated with SSB_A, RSRP_B associated with SSB_B, and RSRP_C associated with SSB_C, where RSRP_A>RSRP_B>RSRP_C. In some embodiments, the RSRP values are (all) above a configured threshold, wherein the UE can report SSB indexes associated with RSRP values above the configured threshold. The UE can include at most 2 SSB indexes in a measurement report (e.g., a maximum number of SSB indexes may correspond to 2 SSB indexes). In some embodiments, if beams associated with SSB_A, SSB_B, and SSB_C are not affected by one or more IDC problems, the UE includes SSB_A and SSB_B in the measurement report, such as based on a determination that SSB_A and SSB_B are associated with highest RSRP values (e.g., RSRP_A and RSRP_B) of the RSRP values for the 3 SSBs. In some embodiments, if the beam associated with SSB_A is affected by one or more IDC problems, the UE includes SSB_B and SSB_C in the measurement report. Alternatively and/or additionally, if the beam associated with SSB_A is affected by one or more IDC problems, the UE includes SSB_B in the measurement report.

The UE may transmit the measurement report to a network. The network may allocate one or more resources for a random access procedure (e.g., at least one of a preamble, Physical Random Access Channel (PRACH) occasion, etc.) on one or more beams associated with one or more reference signals included in the measurement report. The network may not instruct and/or indicate the UE to perform a random access procedure (e.g., a random access procedure for reconfiguration with sync) using beams associated with reference signals not included in the measurement report, at least due to a determination that the beams may have one or more IDC problems and/or one or more potential IDC problems.

The measurement report may be a beam measurement information.

The maximum number may be configured by the network.

In a third concept of the present disclosure, a UE may determine whether to report a reference signal information associated with a beam to a network at least based on whether the beam is affected by one or more IDC problems and/or one or more potential IDC problems. For example, the UE may determine whether to report the reference signal information associated with the beam to the network when the UE performs beam reporting to the network.

The UE may not report a reference signal information associated with a beam to the network if the beam is affected by one or more IDC problems. In some embodiments, the UE may not report a reference signal information associated with the beam to the network based on a determination that the beam is affected by one or more IDC problems.

The UE may report a reference signal information associated with a beam to the network if the beam is not affected by one or more IDC problems. In some embodiments, the UE may report the reference signal information associated with the beam to the network based on a determination that the beam is not affected by one or more IDC problems.

In some embodiments, the UE may select a set of reference signals from configured reference signals, wherein beams associated with each reference signal of the set of reference signals are not affected by one or more IDC problems. The UE may select the set of reference signals from the configured reference signals based on a determination that beams associated with each reference signal of the set of reference signals are not affected by one or more IDC problems. The UE may select one or more beams, having a configured number of beams, from the set of reference signals to report to the network based on one or more measured RSRP values of reference signals associated with the beams. The UE may transmit one or more sets of reference signal information associated with the one or more beams to the network.

Alternatively and/or additionally, the UE may select one or more beams, having a configured number of beams, from the configured reference signals based on one or more measured RSRP values of reference signals associated with the one or more beams. In some embodiments, the UE may not report reference signal information associated with a beam of the one or more beams to the network if the beam has one or more IDC problems and/or one or more potential IDC problems. In some embodiments, the UE may not report reference signal information associated with a beam of the one or more beams to the network based on a determination that the beam has one or more IDC problems and/or one or more potential IDC problems.

The configured reference signals may be a CSI-RS resource set.

The configured reference signals may be a SSB resource set.

In some embodiments, the configured number is a maximum number of reference signal information (e.g., a maximum number of sets of reference signal information associated with beams) the UE could report to the network in one beam reporting (e.g., a single beam report). In some embodiments, the configured number of beams is a maximum number of reference signals and/or a maximum number of beams for which the UE can report reference signal information to the network in a single beam report.

The configured number may be configured by the network.

Alternatively and/or additionally, the UE may determine whether to report a reference signal information associated with a beam at least based on a measurement result associated with a direction of the beam, wherein the measurement result may not be a RSRP value associated with the beam.

In some embodiments, the measurement result may be RSRQ.

In some embodiments, the measurement result may be Received Signal Strength Indicator (RSSI).

In some embodiments, the measurement result may be SINR.

In some embodiments, the measurement result may be channel occupancy.

In a fourth concept of the present disclosure, a UE may determine whether to consider a beam measurement quantity for deriving a cell measurement quantity of a cell at least based on whether a beam associated with the beam measurement quantity has one or more IDC problems and/or one or more potential IDC problems.

The UE may consider a beam measurement quantity associated with a beam for deriving the cell measurement quantity if the beam is not affected by one or more IDC problems. For example, the UE may determine and/or derive the cell measurement quantity based on the beam measurement quantity associated with the beam if the beam is not affected by one or more IDC problems. Alternatively and/or additionally, the UE may determine and/or derive the cell measurement quantity based on the beam measurement quantity associated with the beam based on a determination that the beam is not affected by one or more IDC problems. The UE may not consider the beam measurement quantity associated with a beam for deriving the cell measurement quantity if the beam is affected by one or more IDC problems. For example, the UE may not determine and/or derive the cell measurement quantity based on the beam measurement quantity associated with the beam if the beam is affected by the one or more IDC problems. Alternatively and/or additionally, the UE may not determine and/or derive the cell measurement quantity based on the beam measurement quantity associated with the beam based on a determination that the beam is affected by the one or more IDC problems.

In some embodiments, the UE determines whether to consider a beam measurement quantity for deriving the cell measurement quantity, where the determination is not based on whether the beam is affected by one or more IDC problems. In an example where the determination is not based on whether the beam is affected by one or more IDC problems, the UE may determine to consider the beam measurement quantity associated with the beam for deriving the cell measurement quantity. In the example, the UE may determine and/or derive the cell measurement quantity based on the beam measurement quantity. In an example where the determination is not based on whether the beam is affected by one or more IDC problems, the UE may determine not to consider the beam measurement quantity associated with the beam for deriving the cell measurement quantity. In the example, the UE may not determine and/or derive the cell measurement based on the beam measurement quantity.

In some embodiments, the UE may select a set of SSBs, amounting to (at most) a configured number of SSBs, from a plurality of SSBs associated with a cell, where SSBs of the set of SSBs are associated with highest beam measurement quantity values of a plurality of beam measurement quantity values associated with the plurality of SSBs and the highest beam measurement quantity values are above a configured threshold. In some embodiments, the UE derives a cell measurement quantity (associated with the cell) based on one or more SSBs of the set of SSBs, wherein one or more beams associated with the one or more SSBs are not affected by one or more IDC problems. The one or more SSBs may correspond to a portion of the set of SSBs. Alternatively and/or additionally, the one or more SSBs may comprise each SSB of the set of SSBs. In an example, the UE may derive the cell measurement quantity based on the one or more SSBs based on a determination that the one or more SSBs are not affected by one or more IDC problems. In the example, the UE may not derive the cell measurement quantity based on one or more second SSBs of the set of SSBs based on a determination that the one or more second SSBs are affected by one or more IDC problems.

Alternatively and/or additionally, the UE may select a set of SSBs, amounting to (at most) a configured number of SSBs, from a plurality of SSBs associated with a cell, where beams associated with the set of SSBs are not affected by one or more IDC problems associated with a cell. In some embodiments, the set of SSBs are associated with highest beam measurement quantity values of a plurality of beam measurement quantity values associated with the plurality of SSBs associated with the cell. In some embodiments, the set of SSBs are associated with highest beam measurement quantity values of a second plurality of beam measurement quantity values associated with a second plurality of SSBs associated with the cell, where the second plurality of SSBs comprises SSBs, of the plurality of SSBs, that are associated with beams not affected by one or more IDC problems.

In some embodiments, the configured number of SSBs corresponds to a maximum number of beams the UE could average to derive a cell measurement. In some embodiments, the configured number of SSBs corresponds to a maximum number of beam measurement quantity values the UE could average to derive a cell measurement.

In some embodiments, the UE may select a set of CSI-RSs, amounting to (at most) a configured number of CSI-RSs, from a plurality of CSI-RSs associated with a cell, where CSI-RSs of the set of CSI-RSs are associated with highest beam measurement quantity values of a plurality of beam measurement quantity values associated with the plurality of CSI-RSs and the highest beam measurement quantity values are above a configured threshold. In some embodiments, the UE derives a cell measurement quantity (associated with the cell) based on one or more CSI-RSs of the set of CSI-RSs, wherein one or more beams associated with the one or more CSI-RSs are not affected by one or more IDC problems. The one or more CSI-RSs may correspond to a portion of the set of CSI-RSs. Alternatively and/or additionally, the one or more CSI-RSs may comprise each CSI-RS of the set of CSI-RSs. In an example, the UE may derive the cell measurement quantity based on the one or more CSI-RSs based on a determination that the one or more CSI-RSs are not affected by one or more IDC problems. In the example, the UE may not derive the cell measurement quantity based on one or more second CSI-RSs of the set of CSI-RSs based on a determination that the one or more second CSI-RSs are affected by one or more IDC problems.

Alternatively and/or additionally, the UE may select a set of CSI-RSs, amounting to (at most) a configured number of CSI-RSs, from a plurality of CSI-RSs associated with a cell, where beams associated with the set of CSI-RSs are not affected by one or more IDC problems associated with a cell. In some embodiments, the set of CSI-RSs are associated with highest beam measurement quantity values of a plurality of beam measurement quantity values associated with the plurality of CSI-RSs associated with the cell. In some embodiments, the set of CSI-RSs are associated with highest beam measurement quantity values of a second plurality of beam measurement quantity values associated with a second plurality of CSI-RSs associated with the cell, where the second plurality of CSI-RSs comprises CSI-RSs, of the plurality of CSI-RSs, that are associated with beams not affected by one or more IDC problems.

In some embodiments, the configured number of CSI-RSs corresponds to a maximum number of beams the UE could average to derive a cell measurement. In some embodiments, the configured number of CSI-RSs corresponds to a maximum number of beam measurement quantity values the UE could average to derive a cell measurement.

The beam measurement quantity value may be RSRP.

The beam measurement quantity value may be RSRQ.

The beam measurement quantity value may be SINR.

The cell measurement quantity may be used for triggering a measurement report.

The cell measurement quantity may be included in a measurement report.

In a fifth concept of the present disclosure, a trigger condition is configured and/or designed for a UE to perform one or more reporting operations for a cell associated with one or more beams. The trigger condition may be associated with one or more IDC problems and/or one or more potential IDC problems for the cell. The one or more reporting operations may comprise reporting and/or transmitting one or more signals to a network.

The UE may trigger the one or more reporting operations associated with one or more beams when at least one beam stops being affected by one or more IDC problems and/or one or more potential IDC problems. In some embodiments, the UE may trigger the one or more reporting operations associated with one or more beams when a state of at least one beam changes from being affected by one or more IDC problems and/or one or more potential IDC problems to not being affected by one or more IDC problems and/or one or more potential IDC problems. In some embodiments, the UE may trigger the one or more reporting operations associated with one or more beams responsive to a determination that a state of at least one beam changes from being affected by one or more IDC problems and/or one or more potential IDC problems to not being affected by one or more IDC problems and/or one or more potential IDC problems. In some embodiments, the trigger condition corresponds to a state of at least one beam changing from being affected by one or more IDC problems and/or one or more potential IDC problems to not being affected by one or more IDC problems and/or one or more potential IDC problems.

The UE may trigger the one or more reporting operations associated with one or more beams when a beam starts being affected by one or more IDC problems and/or one or more potential IDC problems. In some embodiments, the UE may trigger the one or more reporting operations associated with one or more beams when a state of a beam changes from not being affected by one or more IDC problems and/or one or more potential IDC problems to being affected by one or more IDC problems and/or one or more potential IDC problems. In some embodiments, the UE may trigger the one or more reporting operations associated with one or more beams responsive to a determination that a state of a beam changes from not being affected by one or more IDC problems and/or one or more potential IDC problems to being affected by one or more IDC problems and/or one or more potential IDC problems. In some embodiments, the trigger condition corresponds to a state of a beam changing from not being affected by one or more IDC problems and/or one or more potential IDC problems to being affected by one or more IDC problems and/or one or more potential IDC problems.

The UE may trigger the one or more reporting operations associated with one or more beams when the UE stops being affected by one or more IDC problems and/or one or more potential IDC problems. In some embodiments, the UE may trigger the one or more reporting operations associated with one or more beams when a state of the UE changes from being affected by one or more IDC problems and/or one or more potential IDC problems to not being affected by one or more IDC problems and/or one or more potential IDC problems. In some embodiments, the UE may trigger the one or more reporting operations associated with one or more beams responsive to a determination that a state of the UE changes from being affected by one or more IDC problems and/or one or more potential IDC problems to not being affected by one or more IDC problems and/or one or more potential IDC problems. In some embodiments, the trigger condition corresponds to a state of the UE changing from being affected by one or more IDC problems and/or one or more potential IDC problems to not being affected by one or more IDC problems and/or one or more potential IDC problems.

The UE may trigger the one or more reporting operations associated with one or more beams when the UE starts being affected by one or more IDC problems and/or one or more potential IDC problems. In some embodiments, the UE may trigger the one or more reporting operations associated with one or more beams when a state of the UE changes from not being affected by one or more IDC problems and/or one or more potential IDC problems to being affected by one or more IDC problems and/or one or more potential IDC problems. In some embodiments, the UE may trigger the one or more reporting operations associated with one or more beams responsive to a determination that a state of the UE changes from not being affected by one or more IDC problems and/or one or more potential IDC problems to being affected by one or more IDC problems and/or one or more potential IDC problems. In some embodiments, the trigger condition corresponds to a state of the UE changing from not being affected by one or more IDC problems and/or one or more potential IDC problems to being affected by one or more IDC problems and/or one or more potential IDC problems.

The UE may not trigger the one or more reporting operations associated with beams when a beam starts being affected by one or more IDC problems and/or one or more potential IDC problems, and the beam is not currently used by the UE. In some embodiments, the UE may not trigger the one or more reporting operations associated with one or more beams when a state of a beam that is not currently being used by the UE changes from not being affected by one or more IDC problems and/or one or more potential IDC problems to being affected by one or more IDC problems and/or one or more potential IDC problems.

The UE may not trigger the one or more reporting operations associated with beams when a beam stops being affected by one or more IDC problems and/or one or more potential IDC problems, and the beam is not currently used by the UE. In some embodiments, the UE may not trigger the one or more reporting operations associated with one or more beams when a state of a beam that is not currently being used by the UE changes from being affected by one or more IDC problems and/or one or more potential IDC problems to not being affected by one or more IDC problems and/or one or more potential IDC problems.

The UE may trigger the one or more reporting operations associated with one or more beams when at least one beam stops being affected by one or more IDC problems and/or one or more potential IDC problems and the at least one beam stopping being affected by one or more IDC problems and/or one or more potential IDC problems affects contents of beam reporting. In some embodiments, the UE may trigger the one or more reporting operations associated with one or more beams when a state of at least one beam changes from being affected by one or more IDC problems and/or one or more potential IDC problems to not being affected by one or more IDC problems and/or one or more potential IDC problems and the change of state affects contents of beam reporting. In some embodiments, the UE may trigger the one or more reporting operations associated with one or more beams responsive to a determination that a state of at least one beam changes from being affected by one or more IDC problems and/or one or more potential IDC problems to not being affected by one or more IDC problems and/or one or more potential IDC problems and/or a determination that the change of state affects contents of beam reporting. In some embodiments, the trigger condition corresponds to a state of at least one beam changing from being affected by one or more IDC problems and/or one or more potential IDC problems to not being affected by one or more IDC problems and/or one or more potential IDC problems, where the change of state affects contents of beam reporting.

The UE may trigger the one or more reporting operations associated with one or more beams when at least one beam starts being affected by one or more IDC problems and/or one or more potential IDC problems and the at least one beam starting to be affected by one or more IDC problems and/or one or more potential IDC problems affects contents of beam reporting. In some embodiments, the UE may trigger the one or more reporting operations associated with one or more beams when a state of at least one beam changes from not being affected by one or more IDC problems and/or one or more potential IDC problems to being affected by one or more IDC problems and/or one or more potential IDC problems and the change of state affects contents of beam reporting. In some embodiments, the UE may trigger the one or more reporting operations associated with one or more beams responsive to a determination that a state of at least one beam changes from not being affected by one or more IDC problems and/or one or more potential IDC problems to being affected by the one or more IDC problems and/or one or more potential IDC problems and/or a determination that the change of state affects contents of beam reporting. In some embodiments, the trigger condition corresponds to a state of at least one beam changing from not being affected by one or more IDC problems and/or one or more potential IDC problems to being affected by one or more IDC problems and/or one or more potential IDC problems, where the change of state affects contents of beam reporting.

Contents of beam reporting that may be affected by a change of state may comprise one or more reference signal identities and/or one or more reference signal identifications associated with one or more beams.

Contents of beam reporting that may be affected by a change of state may comprise SSBRI.

Contents of beam reporting that may be affected by a change of state may comprise CRI.

Contents of beam reporting that may be affected by a change of state may comprise one or more SSB indexes.

Contents of beam reporting that may be affected by a change of state may comprise one or more CSI-RS indexes.

Alternatively and/or additionally, the UE may perform a beam failure recovery procedure when a beam, that is currently used by the UE, starts being affected by one or more IDC problems and/or one or more potential IDC problems. In some embodiments, the UE may perform the beam failure recovery procedure when a state of a beam, that is currently used by the UE, changes from not being affected by one or more IDC problems and/or one or more potential IDC problems to being affected by one or more IDC problems and/or one or more potential IDC problems. In some embodiments, the UE may perform the beam failure recovery procedure responsive to a determination that a state of a beam, that is currently used by the UE, changes from not being affected by one or more IDC problems and/or one or more potential IDC problems to being affected by one or more IDC problems and/or one or more potential IDC problems.

For example, the UE may determine to perform CSI reporting (e.g., L1-RSRP reporting) to report a measurement result quantity of beams responsive to a beam starting to be affected by one or more IDC problems. In some embodiments, the UE may perform the CSI reporting responsive to a state of a beam changing from not being affected by one or more IDC problems and/or one or more potential IDC problems to being affected by one or more IDC problems and/or one or more potential IDC problems. In some embodiments, the UE may trigger the one or more reporting operations associated with one or more beams responsive to a determination that a state of a beam changes from not being affected by one or more IDC problems and/or one or more potential IDC problems to being affected by one or more IDC problems and/or one or more potential IDC problems.

The trigger condition may be triggered without network request. In some embodiments, the UE may trigger the one or more reporting operations without network request. In some embodiments, the UE may perform the beam failure recovery procedure without network request. In some embodiments, the UE may determine to perform the CSI reporting without network request. In some embodiments, the UE may trigger and/or perform the one or more reporting operations, the beam failure recovery procedure and/or the CSI reporting, based on the trigger condition, without network request. In some embodiments, the UE may trigger and/or perform the one or more reporting operations, the beam failure recovery procedure and/or the CSI reporting, responsive to the trigger condition being met, without network request.

The trigger condition may be triggered by the UE itself. In some embodiments, the UE may trigger the one or more reporting operations based on the trigger condition, such as responsive to the trigger condition being met. In some embodiments, the UE may perform the beam failure recovery procedure based on the trigger condition, such as responsive to the trigger condition being met. In some embodiments, the UE may determine to perform the CSI reporting based on the trigger condition, such as responsive to the trigger condition being met.

A beam, such as a beam associated with the trigger condition and/or described with respect to the fifth concept of the present disclosure, may be currently used by the UE.

The beam may not be currently used by the UE.

The beam may be configured (and/or activated) to be used to monitor Physical Downlink Control Channel (PDCCH).

The beam may not be configured (and/or activated) to be used to monitor PDCCH.

The beam may be configured (and/or activated) to be used to transmit one or more signals on Physical Uplink Control Channel (PUCCH).

The beam may not be configured (and/or activated) to be used to transmit one or more signals on PUCCH.

The one or more reporting operations associated with beams may comprise CSI reporting.

When the beam is currently used by the UE, the UE may be using the beam to perform communication with the network.

The one or more reporting operations associated with beams may comprise L1-RSRP reporting.

The one or more reporting operations associated with beams may comprise transmitting and/or reporting one or more beam measurement information reports.

The one or more reporting operations associated with one or more beams may comprise reporting of a signal, reporting of one or more reference signals, reporting of one or more indexes of one or more reference signals, reporting of one or more indexes of one or more SSBs and/or reporting of one or more indexes of one or more CSI-RSs, such as described with respect to the first concept of the present disclosure.

The one or more reporting operations associated with one or more beams may comprise reporting of one or more reference signal identities and/or one or more reference signal identifications associated with one or more beams that are affected by one or more IDC problems and/or one or more potential IDC problems. In some embodiments, the one or more reporting operations associated with one or more beams may comprise transmission of a signal comprising one or more reference signal identities and/or one or more reference signal identifications associated with one or more beams that are affected by one or more IDC problems and/or one or more potential IDC problems.

The one or more reporting operations associated with one or more beams may comprise random access preamble transmission on PRACH.

One, some and/or all of the foregoing concepts and/or embodiments can be formed to a new embodiment.

In some examples, embodiments disclosed herein, such as embodiments described with respect to the first concept, the second concept, the third concept, the fourth concept and the fifth concept, may be implemented independently and/or separately. Alternatively and/or additionally, a combination of two or more of the embodiments disclosed herein, such as embodiments described with respect to the first concept, the second concept, the third concept, the fourth concept and/or the fifth concept, may be implemented. Alternatively and/or additionally, a combination of two or more of the embodiments disclosed herein, such as embodiments described with respect to the first concept, the second concept, the third concept, the fourth concept and/or the fifth concept, may be implemented concurrently and/or simultaneously.

Various techniques of the present disclosure may be performed independently and/or separately from one another. Alternatively and/or additionally, various techniques of the present disclosure may be combined and/or implemented using a single system. Alternatively and/or additionally, various techniques of the present disclosure may be implemented concurrently and/or simultaneously.

In some embodiments, such as one or more embodiments described herein with respect to the first concept, the second concept, the third concept, the fourth concept and/or the fifth concept, a beam may be represented by an index of SSB, an index of CSI-RS, reference signal information (e.g., an index of a reference signal), and/or a TCI state.

Alternatively and/or additionally, when a beam associated with a UE is affected by one or more IDC problems and/or one or more potential IDC problems, the UE may experience interference from collocated radio transceivers (e.g., radio transceivers for LTE, Bluetooth and/or Global Navigation Satellite System (GNSS)) in the UE when the UE uses the beam for receiving (and/or transmitting) data.

Alternatively and/or additionally, when a beam associated with a UE has one or more IDC problems and/or one or more potential IDC problems, the UE may experience interference from collocated radio transceivers (e.g., radio transceivers for LTE, Bluetooth and/or GNSS) in the UE when the UE uses the beam for receiving (and/or transmitting) data.

Alternatively and/or additionally, an affected beam may correspond to a beam that may be affected by one or more IDC problems and/or one or more potential IDC problems.

Alternatively and/or additionally, a non-affected beam may correspond to a beam that may not be affected by one or more IDC problems and/or one or more potential IDC problems.

Alternatively and/or additionally, one or more IDC problems and/or one or more potential IDC problems associated with a beam may not be avoided by a UE. Alternatively and/or additionally, the one or more IDC problems and/or the one or more potential IDC problems may not (and/or cannot) be solved by the UE itself (e.g., the UE may not be able to remove and/or mitigate interference from collocated radio transceivers associated with the one or more IDC problems and/or the one or more potential IDC problems).

In some embodiments, such as one or more embodiments described herein with respect to the first concept, a signal may be a RRC message. Alternatively and/or additionally, the signal may be a MAC control element. Alternatively and/or additionally, the signal may be a signal transmitted on PUCCH. Alternatively and/or additionally, the signal may be a beam reporting (e.g., a beam reporting signal).

In some embodiments, such as one or more embodiments described herein with respect to the first concept, the second concept, the third concept, the fourth concept and/or the fifth concept, one or more reference signals may be one or more SSBs. Alternatively and/or additionally, the one or more reference signals may be one or more CSI-RSs. Alternatively and/or additionally, the one or more reference signals may be associated with a beam received by the UE.

In some embodiments, such as one or more embodiments described herein with respect to the first concept, the second concept, the third concept, the fourth concept and/or the fifth concept, reference signal information may comprise one or more reference signal identities and/or one or more reference signal identifications. Alternatively and/or additionally, the reference signal information may comprise SSBRI. Alternatively and/or additionally, the reference signal information may comprise CRI. Alternatively and/or additionally, the reference signal information may comprise one or more SSB indexes. Alternatively and/or additionally, the reference signal information may comprise one or more CSI-RS indexes. Alternatively and/or additionally, the reference signal information may comprise one or more measurement results of a reference signal. Alternatively and/or additionally, the reference signal information may comprise ResultsPerSSB-Index. Alternatively and/or additionally, the reference signal information may comprise ResultsPerCSI-RS-Index.

In some embodiments, such as one or more embodiments described herein with respect to the first concept, the second concept, the third concept, the fourth concept and/or the fifth concept, a cell may be a serving cell. Alternatively and/or additionally, the cell may be a neighbor cell. Alternatively and/or additionally, the cell may be a licensed cell. Alternatively and/or additionally, the cell may be an unlicensed cell.

In some embodiments, such as one or more embodiments described herein with respect to the first concept, the second concept, the third concept, the fourth concept and/or the fifth concept, beam reporting may be CSI reporting configured by a network to report a reference signal and/or measured RSRP associated with the reference signal. Alternatively and/or additionally, the beam reporting may be L1-RSRP reporting. Alternatively and/or additionally, the beam reporting may comprise transmission of a beam report (e.g., a L1-RSRP report, a CSI report and/or a different type of report) to a network on PUCCH. Alternatively and/or additionally, the beam reporting may comprise transmission of a beam report (e.g., a L1-RSRP report, a CSI report and/or a different type of report) to a network on Physical Uplink Shared Channel (PUSCH).

In some embodiments, such as one or more embodiments described herein with respect to the first concept, the second concept, the third concept, the fourth concept and/or the fifth concept, RSRP of a reference signal may correspond to a linear average over one or more power contributions of one or more resource elements that carry a reference signal.

In some embodiments, such as one or more embodiments described herein with respect to the first concept, the second concept, the third concept, the fourth concept and/or the fifth concept, RSSI may comprise a linear average of a total received power observed in OFDM symbols of one or more measurement time resources, in a measurement bandwidth, over a number of resource blocks from sources.

In some embodiments, such as one or more embodiments described herein with respect to the first concept, the second concept, the third concept, the fourth concept and/or the fifth concept, channel occupancy may be a proportion and/or a percentage of measurement samples where RSSI value is (measured as) above a threshold.

In some embodiments, such as one or more embodiments described herein with respect to the first concept, the second concept, the third concept, the fourth concept and/or the fifth concept, one or more beams may be one or more network beams. Alternatively and/or additionally, the one or more beams may be one or more UE beams. Alternatively and/or additionally, one or more reference signals (and/or reference signal information) associated with one or more beams corresponds to one or more reference signals that are received via the one or more beams.

Figure 9:
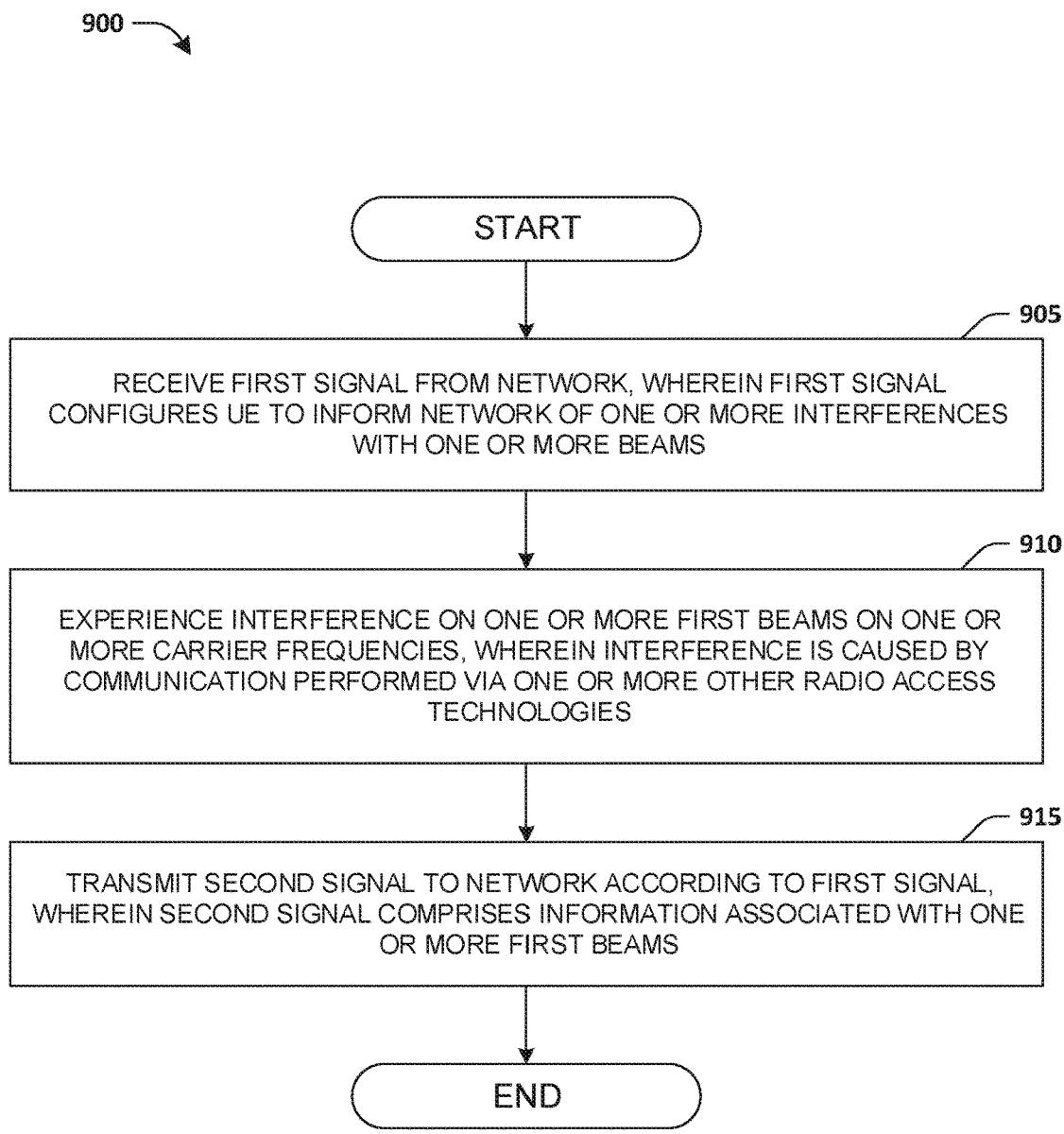
FIG. 9 is a flow chart according to one exemplary embodiment

FIG. 9 is a flow chart 900 according to one exemplary embodiment from the perspective of a UE. In step 905, the UE receives a first signal from a network, wherein the first signal configures the UE to inform the network of one or more interferences with one or more beams. For example, the first signal configures the UE such that the UE is able to inform the network of one or more interferences with one or more beams. In step 910, the UE experiences an interference on one or more first beams on one or more carrier frequencies, wherein the interference is caused by communication performed via one or more other radio access technologies.

In step 915, the UE transmits a second signal to the network according to (and/or based on) the first signal, wherein the second signal comprises information associated with the one or more first beams.

In one embodiment, the second signal indicates the one or more first beams that are affected by the interference.

In one embodiment, the second signal does not indicate a beam not affected by the interference.

In one embodiment, the second signal indicates one or more reference signals associated with the one or more first beams experiencing the interference.

In one embodiment, the second signal does not indicate one or more reference signals associated with one or more beams not affected by the interference.

In one embodiment, the second signal includes one or more identifiers for one or more reference signals associated with the one or more first beams (e.g., the one or more identifiers may identify and/or be indicative of the one or more reference signals).

In one embodiment, the second signal includes one or more identifiers for one or more SSBs associated with the one or more first beams (e.g., the one or more identifiers may identify and/or be indicative of the one or more SSBs).

In one embodiment, the second signal includes one or more identifiers for one or more CSI-RSs associated with the one or more first beams (e.g., the one or more identifiers may identify and/or be indicative of the one or more CSI-RSs).

In one embodiment, the first signal is a RRC message.

In one embodiment, the second signal includes an IDC indication.

In one embodiment, the second signal is a RRC message.

In one embodiment, the second signal is a PUCCH signal.

In one embodiment, the second signal is a MAC control element.

Referring back to FIGS. 3 and 4, in one exemplary embodiment of a UE, the device 300 includes a program code 312 stored in the memory 310. The CPU 308 could execute program code 312 to enable the UE (i) to receive a first signal from a network, wherein the first signal configures the UE to inform the network of one or more interferences with one or more beams, (ii) to experience an interference on one or more first beams on one or more carrier frequencies, wherein the interference is caused by communication performed via one or more other radio access technologies, and (iii) to transmit a second signal to the network according to (and/or based on) the first signal, wherein the second signal comprises information associated with the one or more first beams. Furthermore, the CPU 308 can execute the program code 312 to perform one, some and/or all of the above-described actions and steps and/or others described herein.

Figure 10:
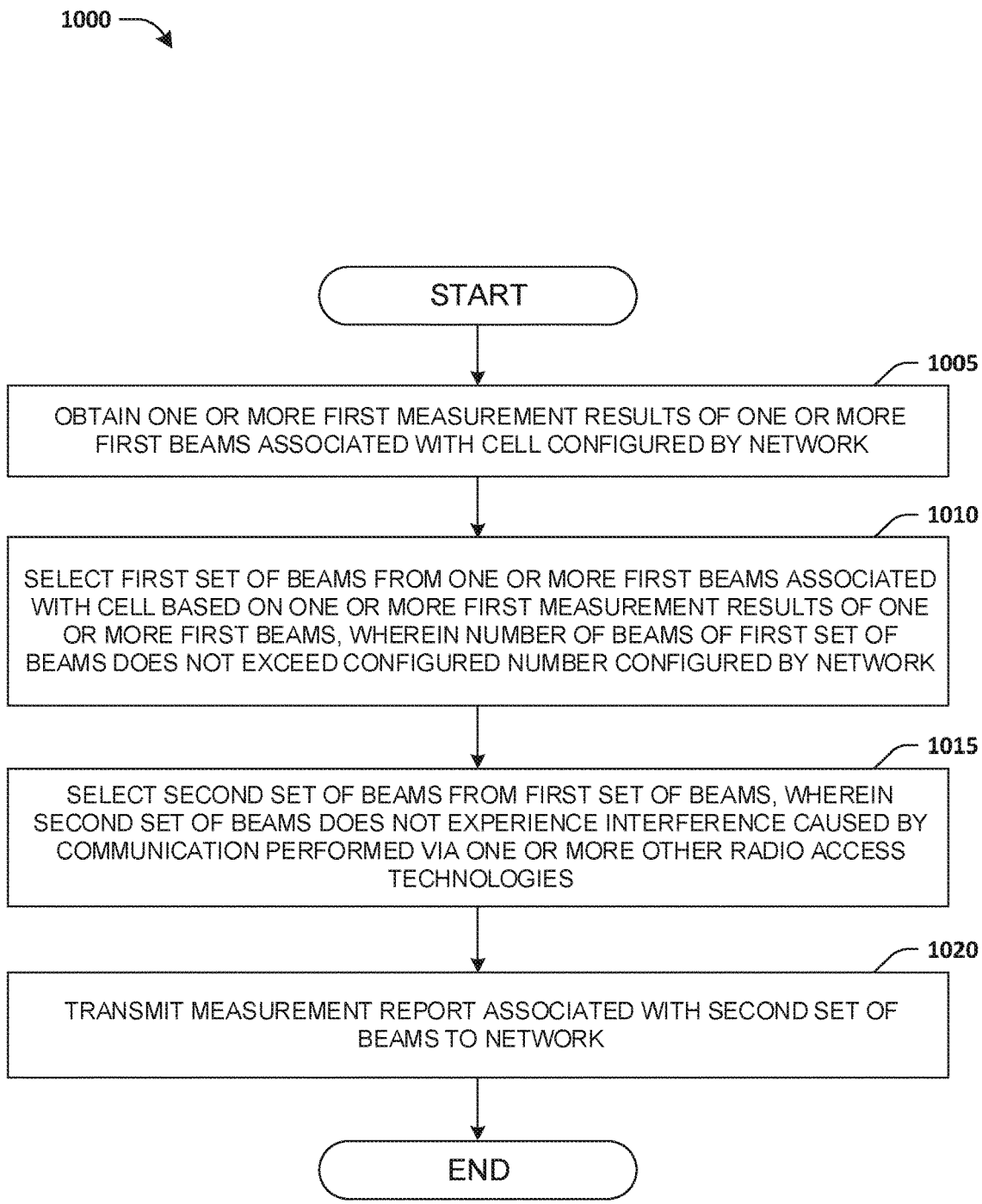
FIG. 10 is a flow chart according to one exemplary embodiment

FIG. 10 is a flow chart 1000 according to one exemplary embodiment from the perspective of a UE. In step 1005, the UE obtains (and/or determines) one or more first measurement results of one or more first beams associated with a cell configured by a network. In step 1010, the UE selects a first set of beams (e.g., a set of one or more beams) from the one or more first beams associated with the cell based on the one or more first measurement results of the one or more first beams, wherein a number of beams of the first set of beams does not exceed a configured number configured by the network. In step 1015, the UE selects a second set of beams (e.g., a set of one or more beams) from the first set of beams, wherein the second set of beams does not experience interference caused by communication performed via one or more other radio access technologies. In step 1020, the UE transmits a measurement report associated with the second set of beams to the network.

In one embodiment, one or more measurement results associated with the first set of beams are highest measurement results of the one or more first measurement results associated with the one or more first beams.

Referring back to FIGS. 3 and 4, in one exemplary embodiment of a UE, the device 300 includes a program code 312 stored in the memory 310. The CPU 308 could execute program code 312 to enable the UE (i) to obtain (and/or to determine) one or more first measurement results of one or more first beams associated with a cell configured by a network, (ii) to select a first set of beams (e.g., a set of one or more beams) from the one or more first beams associated with the cell based on the one or more first measurement results of the one or more first beams, wherein a number of beams of the first set of beams does not exceed a configured number configured by the network, (iii) to select a second set of beams (e.g., a set of one or more beams) from the first set of beams, wherein the second set of beams does not experience interference caused by communication performed via one or more other radio access technologies, and (iv) to transmit a measurement report associated with the second set of beams to the network. Furthermore, the CPU 308 can execute the program code 312 to perform one, some and/or all of the above-described actions and steps and/or others described herein.

Figure 11:
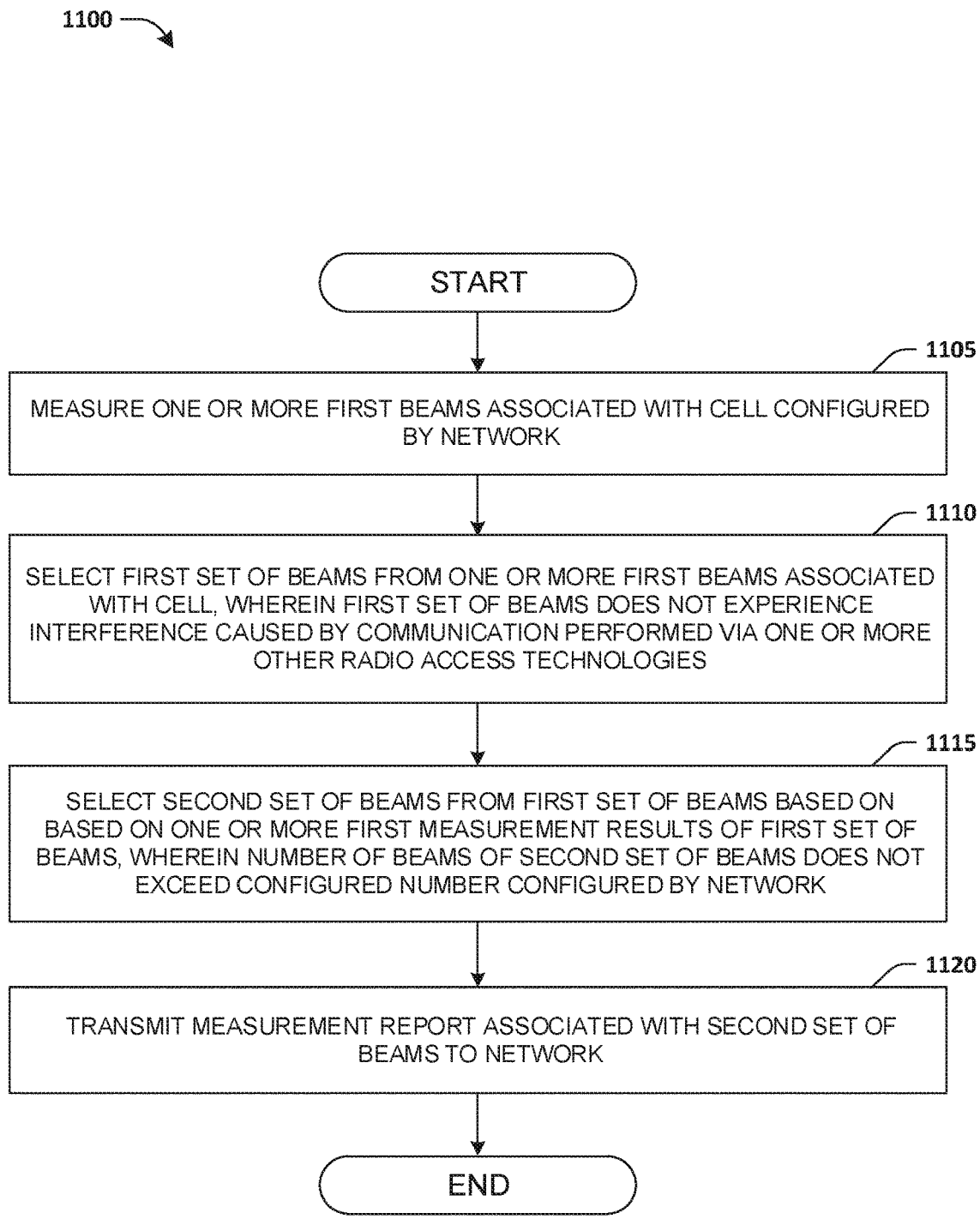
FIG. 11 is a flow chart according to one exemplary embodiment

FIG. 11 is a flow chart 1100 according to one exemplary embodiment from the perspective of a UE. In step 1105, the UE measures one or more first beams associated with a cell configured by a network. In step 1110, the UE selects a first set of beams (e.g., a set of one or more beams) from the one or more first beams associated with the cell, wherein the first set of beams does not experience interference caused by communication performed via one or more other radio access technologies. In step 1115, the UE selects a second set of beams (e.g., a set of one or more beams) from the first set of beams based on based on one or more first measurement results of the first set of beams, wherein a number of beams of the second set of beams does not exceed a configured number configured by the network. In step 1120, the UE transmits a measurement report associated with the second set of beams to the network.

In one embodiment, one or more measurement results associated with the second set of beams are highest measurement results of one or more measurement results associated with the first set of beams.

Referring back to FIGS. 3 and 4, in one exemplary embodiment of a UE, the device 300 includes a program code 312 stored in the memory 310. The CPU 308 could execute program code 312 to enable the UE (i) to measure one or more first beams associated with a cell configured by a network, (ii) to select a first set of beams (e.g., a set of one or more beams) from the one or more first beams associated with the cell, wherein the first set of beams does not experience interference caused by communication performed via one or more other radio access technologies, (iii) to select a second set of beams (e.g., a set of one or more beams) from the first set of beams based on based on one or more first measurement results of the first set of beams, wherein a number of beams of the second set of beams does not exceed a configured number configured by the network, and (iv) to transmit a measurement report associated with the second set of beams to the network. Furthermore, the CPU 308 can execute the program code 312 to perform one, some and/or all of the above-described actions and steps and/or others described herein.

Figure 12:
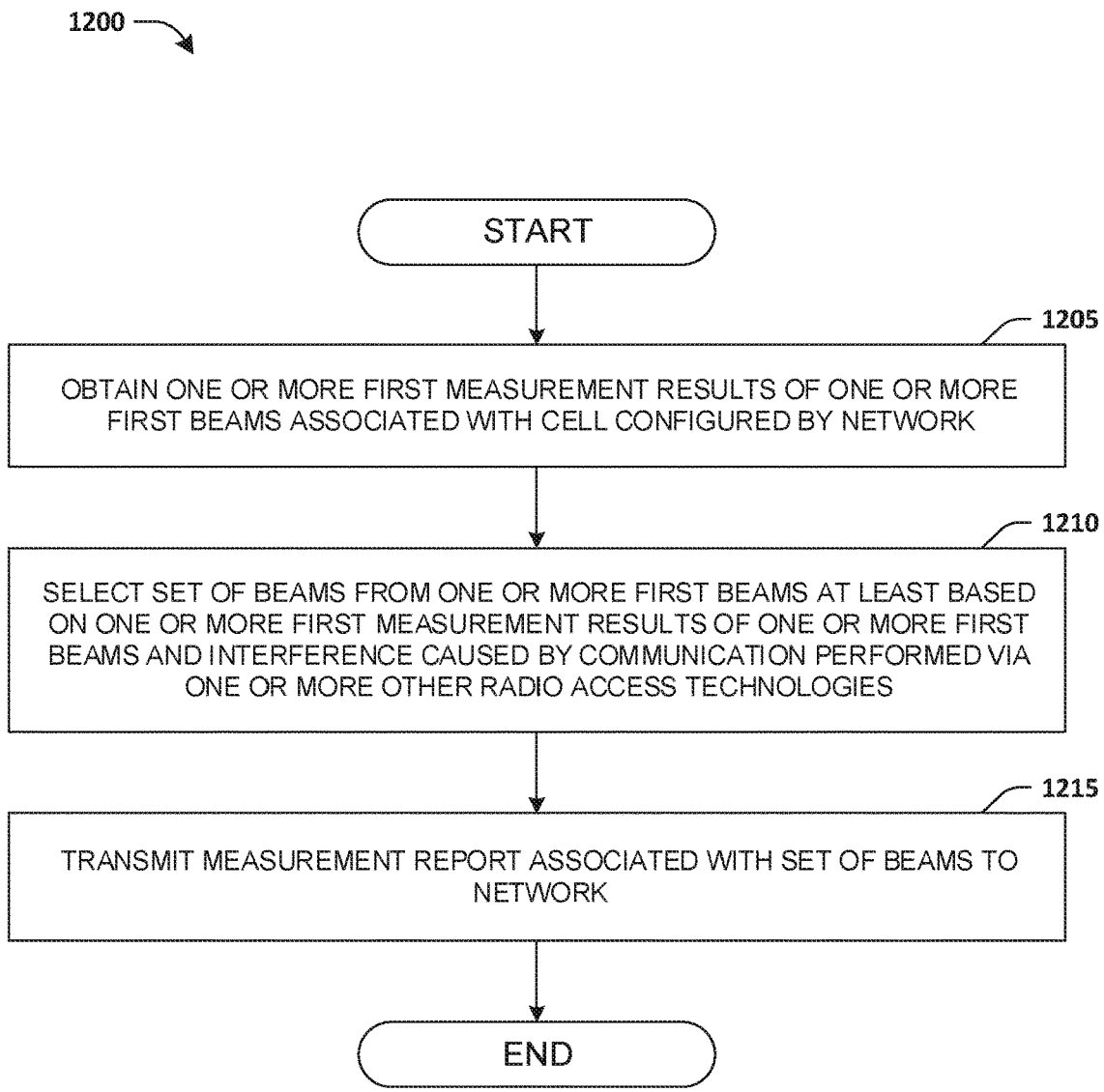
FIG. 12 is a flow chart according to one exemplary embodiment

FIG. 12 is a flow chart 1200 according to one exemplary embodiment from the perspective of a UE. In step 1205, the UE obtains (and/or determines) one or more first measurement results of one or more first beams associated with a cell configured by a network. In step 1210, the UE selects a set of beams (e.g., a set of one or more beams) from the one or more first beams at least based on the one or more first measurement results of the one or more first beams and interference caused by communication performed via one or more other radio access technologies. In step 1215, the UE transmits a measurement report associated with the set of beams to the network.

In one embodiment, the UE does not select a beam from the one or more first beams (for inclusion in the set of beams) if the beam experiences interference caused by communication performed via one or more other radio access technologies.

Referring back to FIGS. 3 and 4, in one exemplary embodiment of a UE, the device 300 includes a program code 312 stored in the memory 310. The CPU 308 could execute program code 312 to enable the UE (i) to obtain (and/or to determine) one or more first measurement results of one or more first beams associated with a cell configured by a network, (ii) to select a set of beams (e.g., a set of one or more beams) from the one or more first beams at least based on the one or more first measurement results of the one or more first beams and interference caused by communication performed via one or more other radio access technologies, and (iii) to transmit a measurement report associated with the set of beams to the network. Furthermore, the CPU 308 can execute the program code 312 to perform one, some and/or all of the above-described actions and steps and/or others described herein.

With respect to FIGS. 10-12, in one embodiment, the configured number is a maximum number of beams the UE could report to the network in one signaling (and/or in a signal).

In one embodiment, the signaling (and/or the signal) is a RRC message.

In one embodiment, the signaling (and/or the signal) is a PUCCH signaling (e.g., a PUCCH signal).

In one embodiment, the signaling (and/or the signal) is a MAC control element.

In one embodiment, the measurement report includes one or more reference signal identities associated with the second set of beams (with respect to FIGS. 10-11) and/or the set of beams (with respect to FIG. 12).

In one embodiment, the measurement report includes one or more measurement results associated with the second set of beams (with respect to FIGS. 10-11) and/or the set of beams (with respect to FIG. 12).

Figure 13:
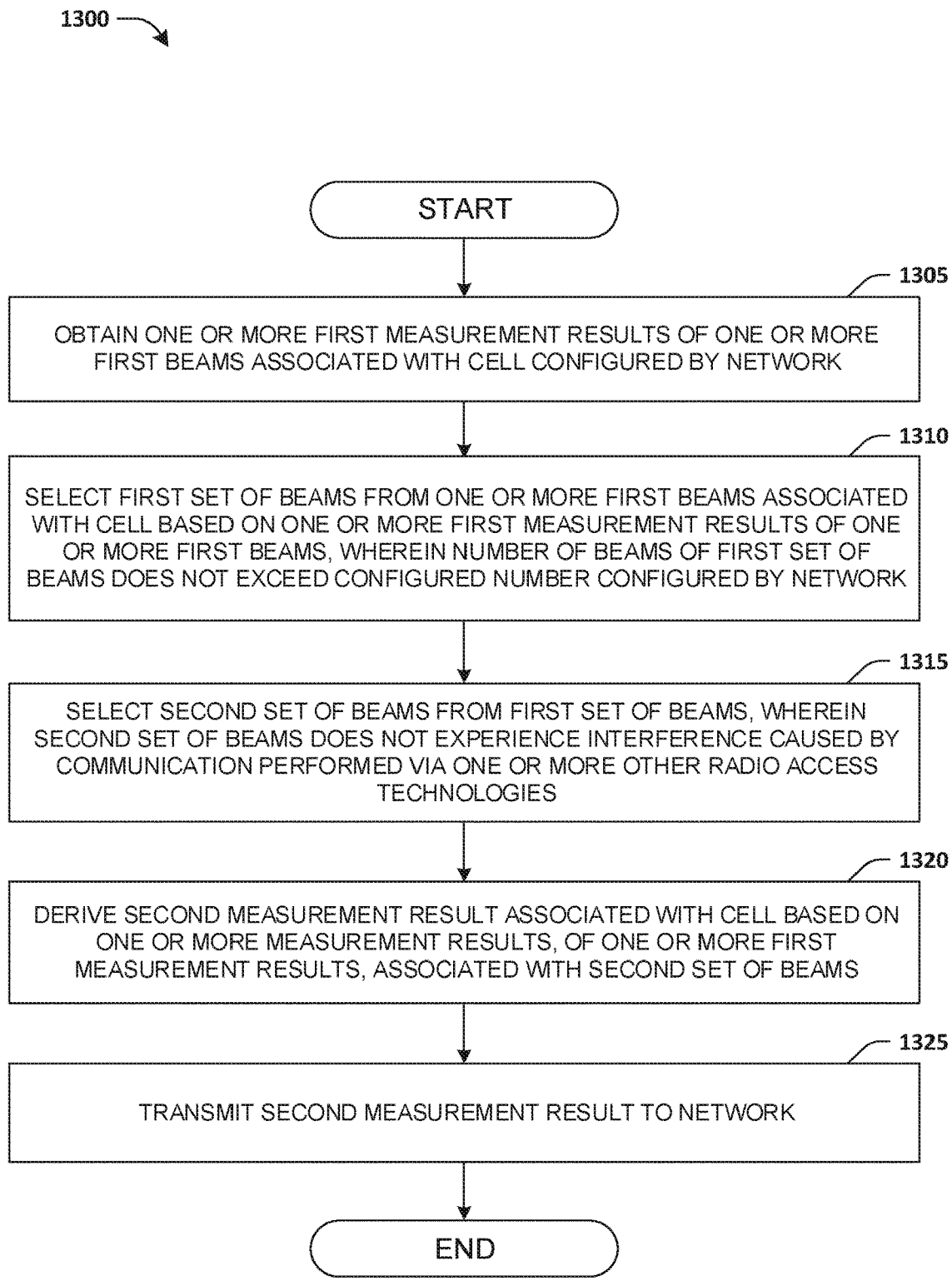
FIG. 13 is a flow chart according to one exemplary embodiment.

FIG. 13 is a flow chart 1300 according to one exemplary embodiment from the perspective of a UE. In step 1305, the UE obtains (and/or determines) one or more first measurement results of one or more first beams associated with a cell configured by a network. In step 1310, the UE selects a first set of beams (e.g., a set of one or more beams) from the one or more first beams associated with the cell based on the one or more first measurement results of the one or more first beams, wherein a number of beams of the first set of beams does not exceed a configured number configured by the network. In step 1315, the UE selects a second set of beams (e.g., a set of one or more beams) from the first set of beams, wherein the second set of beams does not experience interference caused by communication performed via one or more other radio access technologies. In step 1320, the UE derives a second measurement result associated with the cell based on one or more measurement results, of the one or more first measurement results, associated with the second set of beams. In step 1325, the UE transmits the second measurement result to the network.

In one embodiment, one or more measurement results associated with the first set of beams are highest measurement results of the one or more first measurement results associated with the one or more first beams.

Referring back to FIGS. 3 and 4, in one exemplary embodiment of a UE, the device 300 includes a program code 312 stored in the memory 310. The CPU 308 could execute program code 312 to enable the UE (i) to obtain (and/or to determine) one or more first measurement results of one or more first beams associated with a cell configured by a network, (ii) to select a first set of beams (e.g., a set of one or more beams) from the one or more first beams associated with the cell based on the one or more first measurement results of the one or more first beams, wherein a number of beams of the first set of beams does not exceed a configured number configured by the network, (iii) to select a second set of beams (e.g., a set of one or more beams) from the first set of beams, wherein the second set of beams does not experience interference caused by communication performed via one or more other radio access technologies, (iv) to derive a second measurement result associated with the cell based on one or more measurement results, of the one or more first measurement results, associated with the second set of beams, and (v) to transmit the second measurement result to the network. Furthermore, the CPU 308 can execute the program code 312 to perform one, some and/or all of the above-described actions and steps and/or others described herein.

Figure 14:
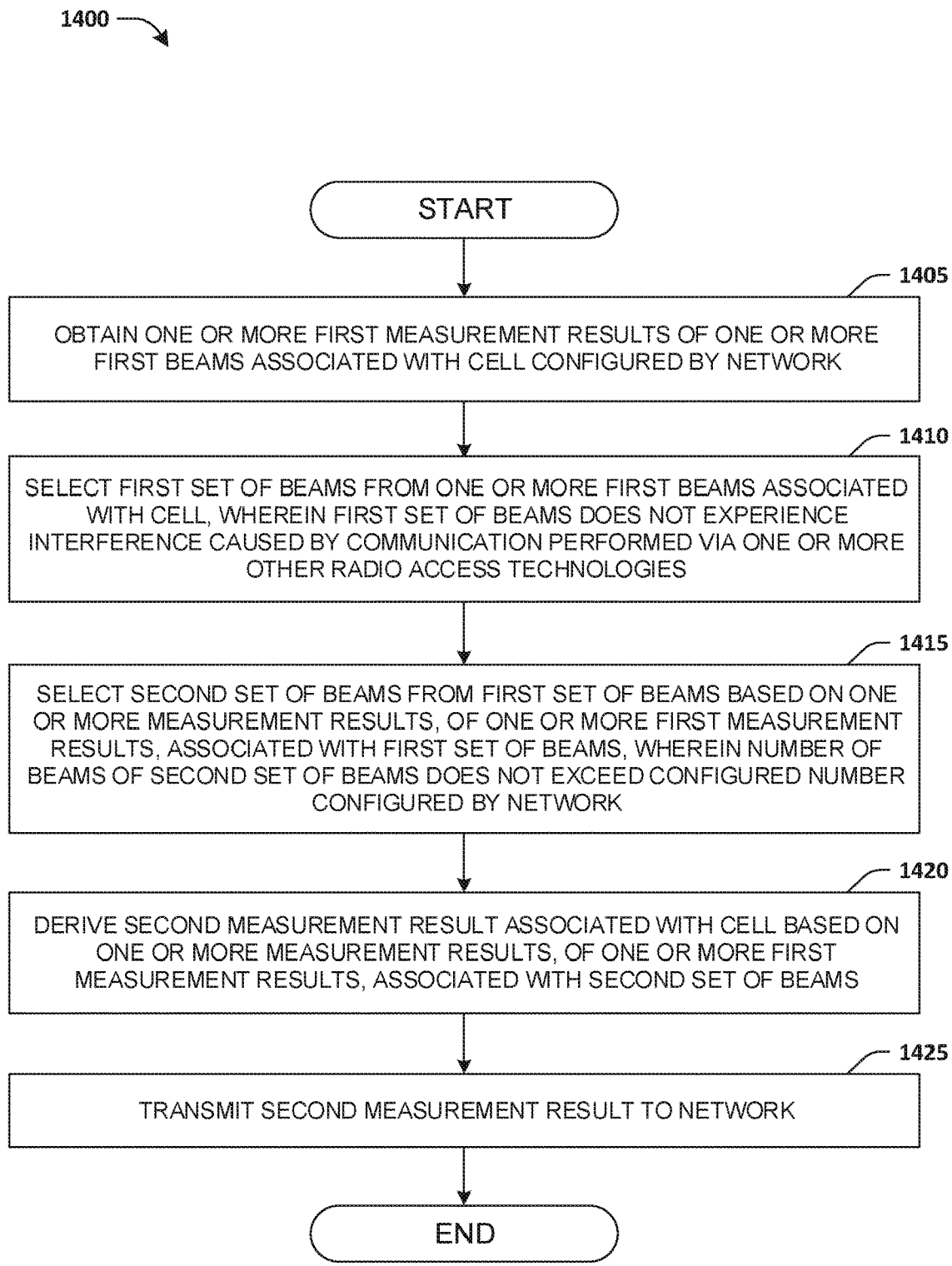
FIG. 14 is a flow chart according to one exemplary embodiment.

FIG. 14 is a flow chart 1400 according to one exemplary embodiment from the perspective of a UE. In step 1405, the UE obtains (and/or determines) one or more first measurement results of one or more first beams associated with a cell configured by a network. In step 1410, the UE selects a first set of beams (e.g., a set of one or more beams) from the one or more first beams associated with the cell, wherein the first set of beams does not experience interference caused by communication performed via one or more other radio access technologies. In step 1415, the UE selects a second set of beams (e.g., a set of one or more beams) from the first set of beams based on one or more measurement results, of the one or more first measurement results, associated with the first set of beams, wherein a number of beams of the second set of beams does not exceed a configured number configured by the network. In step 1420, the UE derives a second measurement result associated with the cell based on one or more measurement results, of the one or more first measurement results, associated with the second set of beams. In step 1425, the UE transmits the second measurement result to the network.

In one embodiment, the one or more measurement results associated with the second set of beams are highest measurement results of one or more measurement results associated with the first set of beams.

Referring back to FIGS. 3 and 4, in one exemplary embodiment of a UE, the device 300 includes a program code 312 stored in the memory 310. The CPU 308 could execute program code 312 to enable the UE (i) to obtain (and/or to determine) one or more first measurement results of one or more first beams associated with a cell configured by a network, (ii) to select a first set of beams (e.g., a set of one or more beams) from the one or more first beams associated with the cell, wherein the first set of beams does not experience interference caused by communication performed via one or more other radio access technologies, (iii) to select a second set of beams (e.g., a set of one or more beams) from the first set of beams based on one or more measurement results, of the one or more first measurement results, associated with the first set of beams, wherein a number of beams of the second set of beams does not exceed a configured number configured by the network, (iv) to derive a second measurement result associated with the cell based on one or more measurement results, of the one or more first measurement results, associated with the second set of beams, and (v) to transmit the second measurement result to the network. Furthermore, the CPU 308 can execute the program code 312 to perform one, some and/or all of the above-described actions and steps and/or others described herein.

With respect to FIGS. 13-14, in one embodiment, the configured number corresponds to a maximum number of measurement results of beams the UE can consider when deriving the second measurement result associated with the cell.

Figure 15:
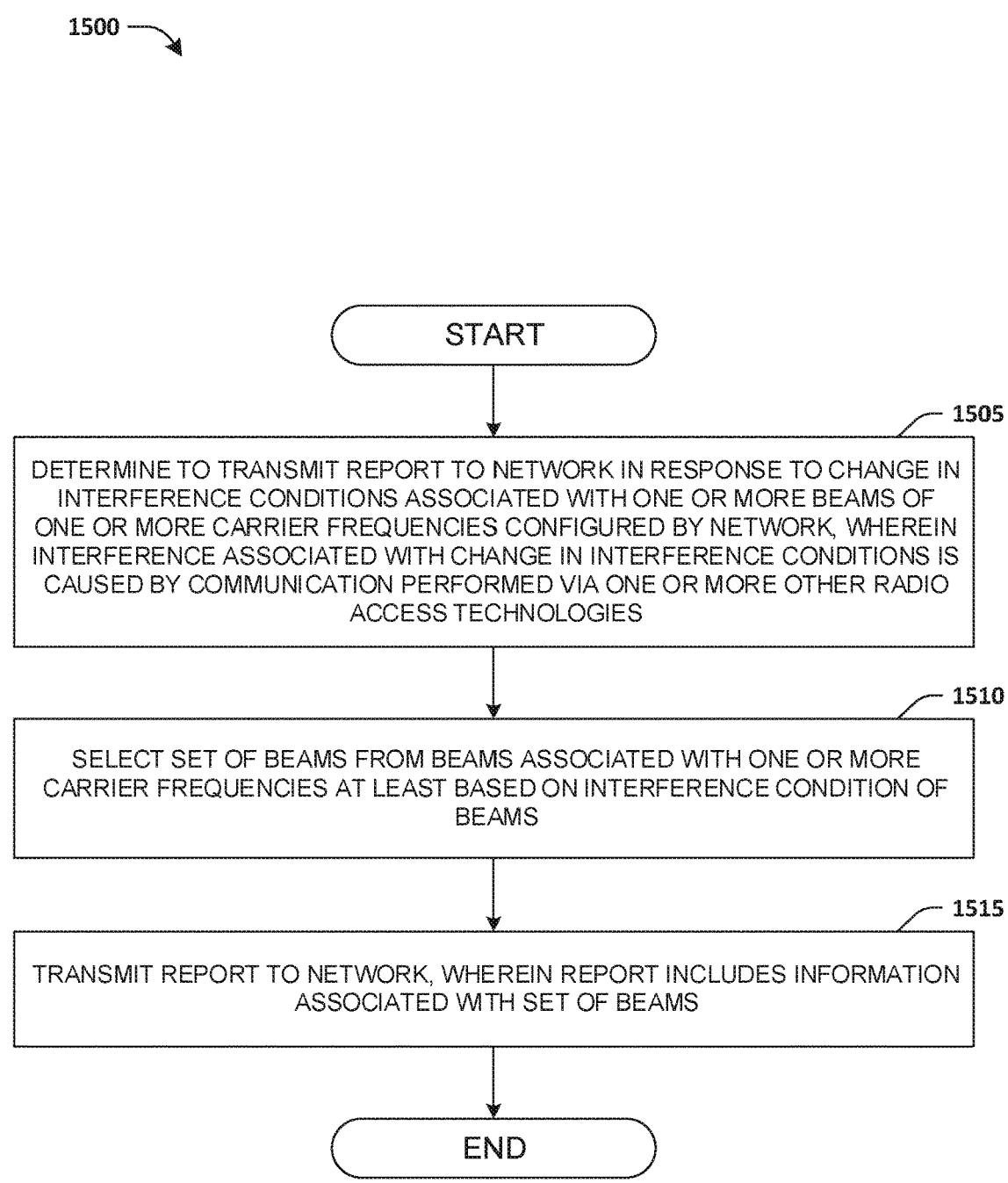
FIG. 15 is a flow chart according to one exemplary embodiment.

FIG. 15 is a flow chart 1500 according to one exemplary embodiment from the perspective of a UE. In step 1505, the UE determines to transmit a report to a network in response to a change in interference conditions associated with one or more beams of one or more carrier frequencies configured by the network, wherein interference associated with the change in interference conditions is caused by communication performed via one or more other radio access technologies. In step 1510, the UE selects a set of beams from beams associated with the one or more carrier frequencies at least based on an interference condition of the beams. In step 1515, the UE transmits the report to the network, wherein the report includes information associated with the set of beams.

In one embodiment, the set of beams does not include one or more beams experiencing the interference.

In one embodiment, the set of beams comprises one or more beams experiencing the interference.

In one embodiment, the UE determines to transmit the report in response to a beam beginning to experience the interference.

In one embodiment, the change in interference conditions comprises an interference condition of a beam changing from not experiencing the interference to experiencing the interference.

In one embodiment, the UE determines to transmit the report in response to a beam ceasing to experience the interference.

In one embodiment, the change in interference conditions comprises an interference condition of a beam changing from experiencing the interference to not experiencing the interference.

In one embodiment, the UE does not determine to transmit the report when beams currently used by the UE do not experience the interference.

In one embodiment, the UE selects the set of beams from the beams associated with the one or more carrier frequencies based on measurement results associated with the beams.

In one embodiment, the set of beams comprises one or more beams associated with one or more highest measurement results of the measurement results associated with the beams.

In one embodiment, the information associated with the set of beams includes one or more reference signal identities and/or one or more reference signal identifications associated with the beams.

In one embodiment, the information associated with the set of the beams includes measurement results of one or more reference signals, one or more reference signal identities and/or one or more reference signal identifications associated with the beams.

Referring back to FIGS. 3 and 4, in one exemplary embodiment of a UE, the device 300 includes a program code 312 stored in the memory 310. The CPU 308 could execute program code 312 to enable the UE (i) to determine to transmit a report to a network in response to a change in interference conditions associated with one or more beams of one or more carrier frequencies configured by the network, wherein interference associated with the change in interference conditions is caused by communication performed via one or more other radio access technologies, (ii) to select a set of beams from beams associated with the one or more carrier frequencies at least based on an interference condition of the beams, and (iii) to transmit the report to the network, wherein the report includes information associated with the set of beams. Furthermore, the CPU 308 can execute the program code 312 to perform one, some and/or all of the above-described actions and steps and/or others described herein.

With respect to FIGS. 9-15, in one embodiment, the one or more other radio access technologies comprise WiFi.

In one embodiment, the one or more other radio access technologies comprise Bluetooth.

In one embodiment, the one or more other radio access technologies comprise GNSS.

In one embodiment, the UE uses WLAN on a carrier that overlaps with a carrier frequency of the one or more carrier frequencies.

In one embodiment, the UE uses WLAN on a carrier adjacent to a carrier frequency of the one or more carrier frequencies.

In one embodiment, the UE uses WLAN on a band that overlaps with a carrier frequency of the one or more carrier frequencies.

In one embodiment, the UE uses WLAN on a band adjacent to a carrier frequency of the one or more carrier frequencies.

In one embodiment, the interference may not (and/or cannot) be solved by the UE (by itself).

In one embodiment, the interference is IDC interference.

In one embodiment, the interference is referred to as an IDC problem.

In one embodiment, the one or more carrier frequencies correspond to a serving cell.

In one embodiment, the one or more carrier frequencies correspond to a primary cell.

In one embodiment, the one or more carrier frequencies correspond to a secondary cell.

In one embodiment, the one or more carrier frequencies are in a NR licensed spectrum.

In one embodiment, the one or more carrier frequencies are in a NR unlicensed spectrum.

In one embodiment, the one or more first measurement results are one or more RSRPs.

In one embodiment, the one or more first measurement results are one or more RSRQs.

In one embodiment, the one or more first measurement results are one or more SINRs.

In one embodiment, the one or more first measurement results are one or more channel occupancies.

In one embodiment, the second measurement result associated with the cell is a linear power scale average of one or more measurement results, of the one or more first measurement results, associated with the second set of beams.

In one embodiment, the one or more reference signals are one or more SSBs.

In one embodiment, the one or more reference signals are one or more CSI-RSs.

In one embodiment, a beam experiencing interference corresponds to the UE encountering heavy interference when using the beam for communication to a network.

In one embodiment, a beam experiences interference when the UE encounters heavy interference when using the beam for communication to a network.

Figure 16:
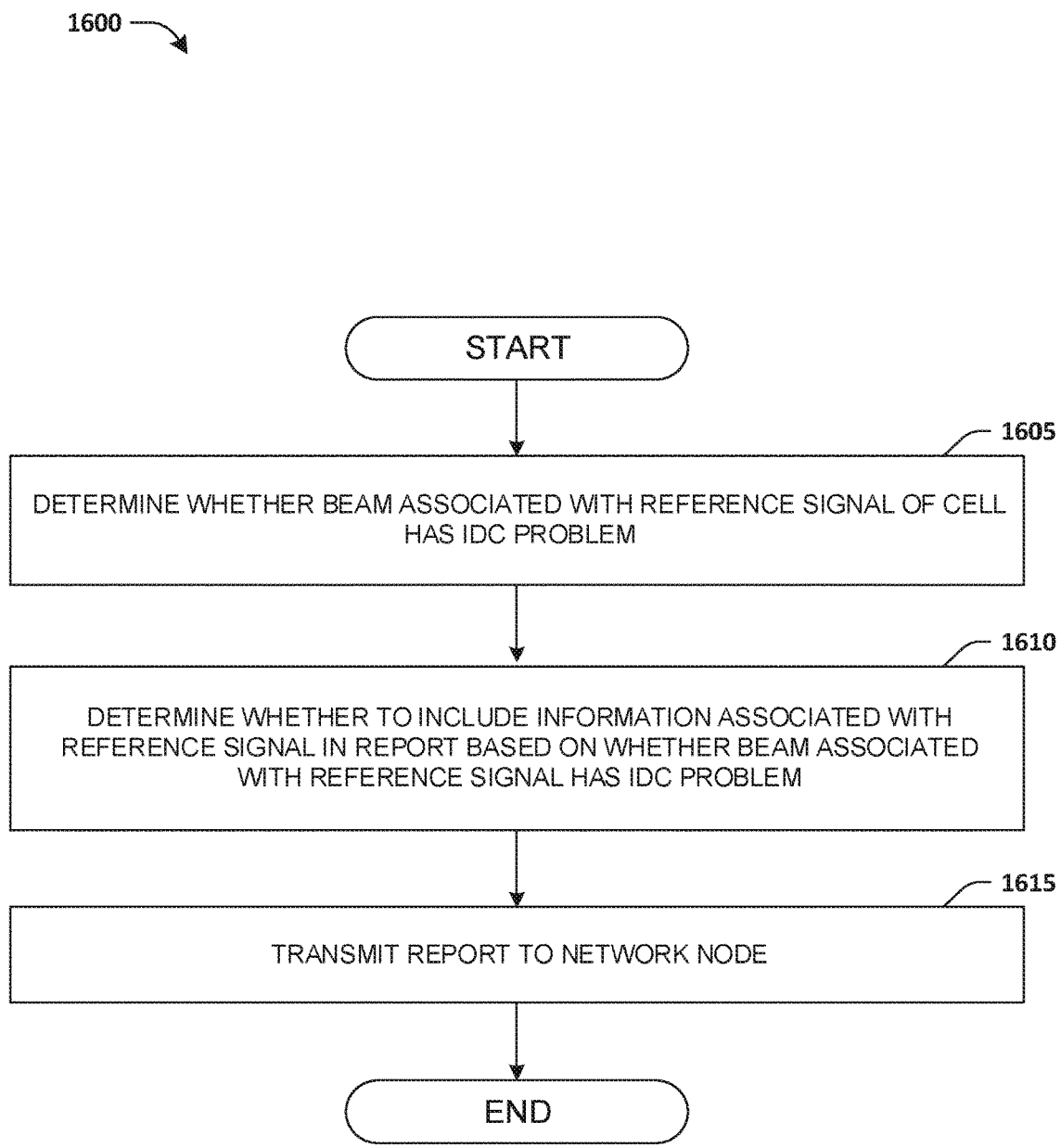
FIG. 16 is a flow chart according to one exemplary embodiment.

FIG. 16 is a flow chart 1600 according to one exemplary embodiment from the perspective of a UE. In step 1605, the UE determines whether a beam associated with a reference signal of a cell has an IDC problem. In step 1610, the UE determines whether to include information associated with the reference signal in a report based on whether the beam associated with the reference signal has the IDC problem. In step 1615, the UE transmits the report to a network node.

In one embodiment, the report is generated based on the determination of whether to include the information in the report.

In one embodiment, the report does not include the information if the beam has the IDC problem.

In one embodiment, the UE determines that the beam has the IDC problem. The UE may not include the information in the report based on the determination that the beam has the IDC problem.

In one embodiment, the information is allowed to be included in the report if the beam does not have the IDC problem.

In one embodiment, the UE determines that the beam does not have the IDC problem. The UE may include the information in the report based on the determination that the beam does not have the IDC problem. The UE may include the information in the report based on a measurement result associated with the beam. In an example, the UE may select, from amongst one or more first beams, a first set of beams based on one or more measurement results associated with the one or more first beams and/or based on a determination that the first set of beams is not affected by one or more IDC problems. The first set of beams may comprise the beam. A number of beams of the first set of beams may not exceed a configured number configured by the network. The one or more measurement results associated with the first set of beams may be highest measurement results of one or more beams, of the one or more first beams, that are not affected by one or more IDC problems. One or more sets of information, comprising the information, associated with the first set of beams may be included in the report.

In one embodiment, the reference signal is a SSB or a CSI-RS.

In one embodiment, the information comprises an identity of the reference signal.

In one embodiment, the information comprises a measurement result of the reference signal.

In one embodiment, the UE uses the beam to receive the reference signal.

In one embodiment, the report is a MeasurementReport message in RRC layer.

In one embodiment, the report includes a cell measurement quantity associated with the cell.

In one embodiment, the UE determines whether to consider a beam measurement quantity of the beam to derive the cell measurement quantity based on whether the beam has the IDC problem.

In one embodiment, the UE determines whether to consider a beam measurement quantity of the beam for deriving the cell measurement quantity based on whether the beam associated with the reference signal has the IDC problem. The UE may derive the cell measurement quantity based on the determination of whether to consider the beam measurement quantity.

In one embodiment, the UE determines that the beam has the IDC problem. The UE may derive the cell measurement quantity based on one or more beam measurement quantities of one or more second beams other than the beam based on the determination that the beam has the IDC problem. Alternatively and/or additionally, the UE may not derive the cell measurement quantity based on a beam measurement quantity of the beam based on the determination that the beam has the IDC problem.

In one embodiment, the UE determines that the beam does not have the IDC problem. The UE may derive the cell measurement quantity based on a beam measurement quantity of the beam based on the determination that the beam does not have the IDC problem.

In one embodiment, the report is a CSI report.

Referring back to FIGS. 3 and 4, in one exemplary embodiment of a UE, the device 300 includes a program code 312 stored in the memory 310. The CPU 308 could execute program code 312 to enable the UE (i) to determine whether a beam associated with a reference signal of a cell has an IDC problem, (ii) to determine whether to include information associated with the reference signal in a report based on whether the beam associated with the reference signal has the IDC problem, and (iii) to transmit the report to a network node. Furthermore, the CPU 308 can execute the program code 312 to perform one, some and/or all of the above-described actions and steps and/or others described herein.

A communication device (e.g., a UE, a base station, a network node, etc.) may be provided, wherein the communication device may comprise a control circuit, a processor installed in the control circuit and/or a memory installed in the control circuit and coupled to the processor. The processor may be configured to execute a program code stored in the memory to perform method steps illustrated in one or more of FIGS. 9-16. Furthermore, the processor may execute the program code to perform one, some and/or all of the above-described actions and steps and/or others described herein.

A computer-readable medium may be provided. The computer-readable medium may be a non-transitory computer-readable medium. The computer-readable medium may comprise processor-executable instructions, that when executed cause performance of method steps illustrated in one or more of FIGS. 9-16, and/or one, some and/or all of the above-described actions and steps and/or others described herein.

It may be appreciated that applying one or more of the techniques presented herein may result in one or more benefits including, but not limited to, improving efficiency and/or reducing power consumption as a result of preventing a network from scheduling a UE (e.g., scheduling resources for the UE) using beams affected by IDC interference, as a result of enabling the UE to report suitable beams to the network, as a result of enabling the UE to report a change in interference conditions to the network, such as responsive to a state of a beam changing from being affected by IDC interference to not being affected by IDC interference and/or responsive to a state of a beam changing from not being affected by IDC interference to being affected by IDC interference, as a result of enabling the UE to report cell measurements that are determined based on an identification of beams affected by IDC interference to the network, etc.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Alternatively and/or additionally, in some aspects any suitable computer-program product may comprise a computer-readable medium comprising codes relating to one or more of the aspects of the disclosure. In some aspects a computer program product may comprise packaging materials.

While the disclosed subject matter has been described in connection with various aspects, it will be understood that the disclosed subject matter is capable of further modifications. This application is intended to cover any variations, uses or adaptation of the disclosed subject matter following, in general, the principles of the disclosed subject matter, and including such departures from the present disclosure as come within the known and customary practice within the art to which the disclosed subject matter pertains.

The invention claimed is:

1. A method of a User Equipment (UE), the method comprising:
   determining that a beam associated with a reference signal of a cell has an In-Device Coexistence (IDC) problem;
   determining to not include information associated with the reference signal in a report based on the determination that the beam associated with the reference signal has the IDC problem; and
   transmitting the report to a network node.

2. The method of claim 1, comprising:
    determining whether a second beam associated with a second reference signal of a second cell has a second IDC problem;
    determining whether to include second information associated with the second reference signal in a second report based on whether the second beam associated with the second reference signal has the second IDC problem; and
    transmitting the second report.

3. The method of claim 2, wherein the determining whether the second beam associated with the second reference signal has the second IDC problem comprises determining that the second beam does not have the second IDC problem, the method comprising:
    including the second information in the second report based on the determination that the second beam does not have the second IDC problem.

4. The method of claim 1, wherein:
    the reference signal is a Synchronization Signal (SS)/Physical Broadcast Channel (PBCH) Block (SSB) or a Channel State Information Reference Signal (CSI-RS).

5. The method of claim 1, wherein:
    the information comprises an identity of the reference signal.

6. The method of claim 1, wherein:
    the information comprises a measurement result of the reference signal.

7. The method of claim 1, comprising:
    receiving the reference signal using the beam.

8. The method of claim 1, wherein:
    the report is a MeasurementReport message in Radio Resource Control (RRC) layer.

9. The method of claim 1, wherein:
    the report comprises a cell measurement quantity associated with the cell.

10. The method of claim 9, comprising:
    determining whether to consider a beam measurement quantity of the beam for deriving the cell measurement quantity based on whether the beam associated with the reference signal has the IDC problem; and
    deriving the cell measurement quantity based on the determination of whether to consider the beam measurement quantity.

11. The method of claim 9, comprising:
    deriving the cell measurement quantity based on one or more beam measurement quantities of one or more second beams other than the beam based on the determination that the beam has the IDC problem.

12. The method of claim 2, wherein the second report comprises a second cell measurement quantity associated with the second cell, wherein the determining whether the second beam associated with the second reference signal has the second IDC problem comprises determining that the second beam does not have the second IDC problem, the method comprising:
    deriving the second cell measurement quantity based on a second beam measurement quantity of the second beam based on the determination that the second beam does not have the second IDC problem.

13. The method of claim 1, wherein:
    the report is a Channel State Information (CSI) report.

14. A communication device, comprising:
    a processor; and
    memory comprising processor-executable instructions that when executed by the processor cause performance of operations, the operations comprising:
        determining that a beam associated with a reference signal of a cell has an In-Device Coexistence (IDC) problem;
        determining to not include information associated with the reference signal in a report based on the determination that the beam associated with the reference signal has the IDC problem; and
        transmitting the report to a network node.

15. The communication device of claim 14, the operations comprising:
    determining whether a second beam associated with a second reference signal of a second cell has a second IDC problem;
    determining whether to include second information associated with the second reference signal in a second report based on whether the second beam associated with the second reference signal has the second IDC problem; and
    transmitting the second report.

16. The communication device of claim 15, wherein the determining whether the second beam associated with the second reference signal has the second IDC problem comprises determining that the second beam does not have the second IDC problem, the operations comprising:
    including the second information in the second report based on the determination that the second beam does not have the second IDC problem.

17. The communication device of claim 14, wherein:
    the reference signal is a Synchronization Signal (SS)/Physical Broadcast Channel (PBCH) Block (SSB) or a Channel State Information Reference Signal (CSI-RS).

18. The communication device of claim 14, wherein:
    the information comprises an identity of the reference signal.

19. The communication device of claim 14, wherein:
    the information comprises a measurement result of the reference signal.

20. A non-transitory computer-readable medium comprising processor-executable instructions that when executed cause performance of operations, comprising:
    determining that a beam associated with a reference signal of a cell has an In-Device Coexistence (IDC) problem;
    determining to not include information associated with the reference signal in a report based on the determination that the beam associated with the reference signal has the IDC problem; and
    transmitting the report to a network node.

21. A method of a User Equipment (UE), the method comprising:
    determining whether a beam associated with a reference signal of a cell has an In-Device Coexistence (IDC) problem;
    determining whether to include information associated with the reference signal in a report based on whether the beam associated with the reference signal has the IDC problem;
    deriving a cell measurement quantity based on at least one of:
        a determination of whether to consider at least one beam measurement quantity of the beam for deriving the cell measurement quantity based on whether the beam associated with the reference signal has the IDC problem;
        one or more beam measurement quantities of one or more second beams other than the beam based on a determination that the beam has the IDC problem; or a beam measurement quantity of the beam based on a determination that the beam does not have the IDC problem, wherein the report comprises the cell measurement quantity associated with the cell; and
transmitting the report to a network node.

\* \* \* \* \*